United States Patent [19]

Wilkes

[11] 4,261,589
[45] Apr. 14, 1981

[54] SUSPENSION SYSTEM

[75] Inventor: Donald F. Wilkes, Albuquerque, N. Mex.

[73] Assignee: Atlantic Richfield Company, Los Angeles, Calif.

[21] Appl. No.: 969,087

[22] Filed: Dec. 13, 1978

Related U.S. Application Data

[63] Continuation-in-part of Ser. No. 953,843, Oct. 23, 1978.

[51] Int. Cl.³ .............................................. B62D 57/00
[52] U.S. Cl. ................................. 280/28.5; 16/18 A; 180/7 R; 280/29; 280/242 WC; 301/5 R; 301/41 R
[58] Field of Search ................... 180/7 R, 8 R, 8 F, 9, 180/209, 291, 313; 16/18 R, 18 A, 35 R; 280/200, 29, 229, 218, 219, 28.5, 242 R, 242 WC; 305/60; 301/5 R, 41 R, 63 R

[56] References Cited

U.S. PATENT DOCUMENTS

| 912,010 | 2/1909 | Martin | 301/63 R |
|---|---|---|---|
| 2,683,495 | 7/1954 | Kopzeynski | 180/7 R |
| 2,810,151 | 10/1957 | Lapham | 16/18 A |
| 2,878,070 | 3/1959 | Nojima | 301/5 R |
| 2,979,360 | 4/1961 | Nojima | 16/18 A |
| 3,001,601 | 9/1961 | Aghnides | 180/7 R |
| 3,161,907 | 12/1964 | Anthony | 16/18 R |
| 3,212,594 | 10/1965 | Scott | 180/7 R |
| 3,363,713 | 1/1968 | Blonsky | 180/291 |
| 3,364,874 | 1/1968 | Toennesen | 180/7 R |
| 3,763,957 | 10/1973 | Hunt | 301/5 R |
| 3,928,888 | 12/1975 | Lapham | 16/35 R |
| 4,161,803 | 7/1979 | Propst et al. | 16/18 A |

*Primary Examiner*—John J. Love
*Assistant Examiner*—Donn McGiehan
*Attorney, Agent, or Firm*—Burns, Doane, Swecker & Mathis

[57] ABSTRACT

A self-righting rolling suspension system is disclosed which has two ground contact zones and has self-righting stability in perpendicular planes, one of which includes the contact zones and one of which is perpendicular thereto. The system includes rolling support members that may be discs, annuli, cones or similar bodies of revolution. With the preferred orientation of the rolling supports, an effective radius several times the actual radius of the rolling support results. A self-adjusting differential is also obtained from one application of the principles. Shock absorbing and braking assemblies can also be incorporated in the system.

41 Claims, 47 Drawing Figures

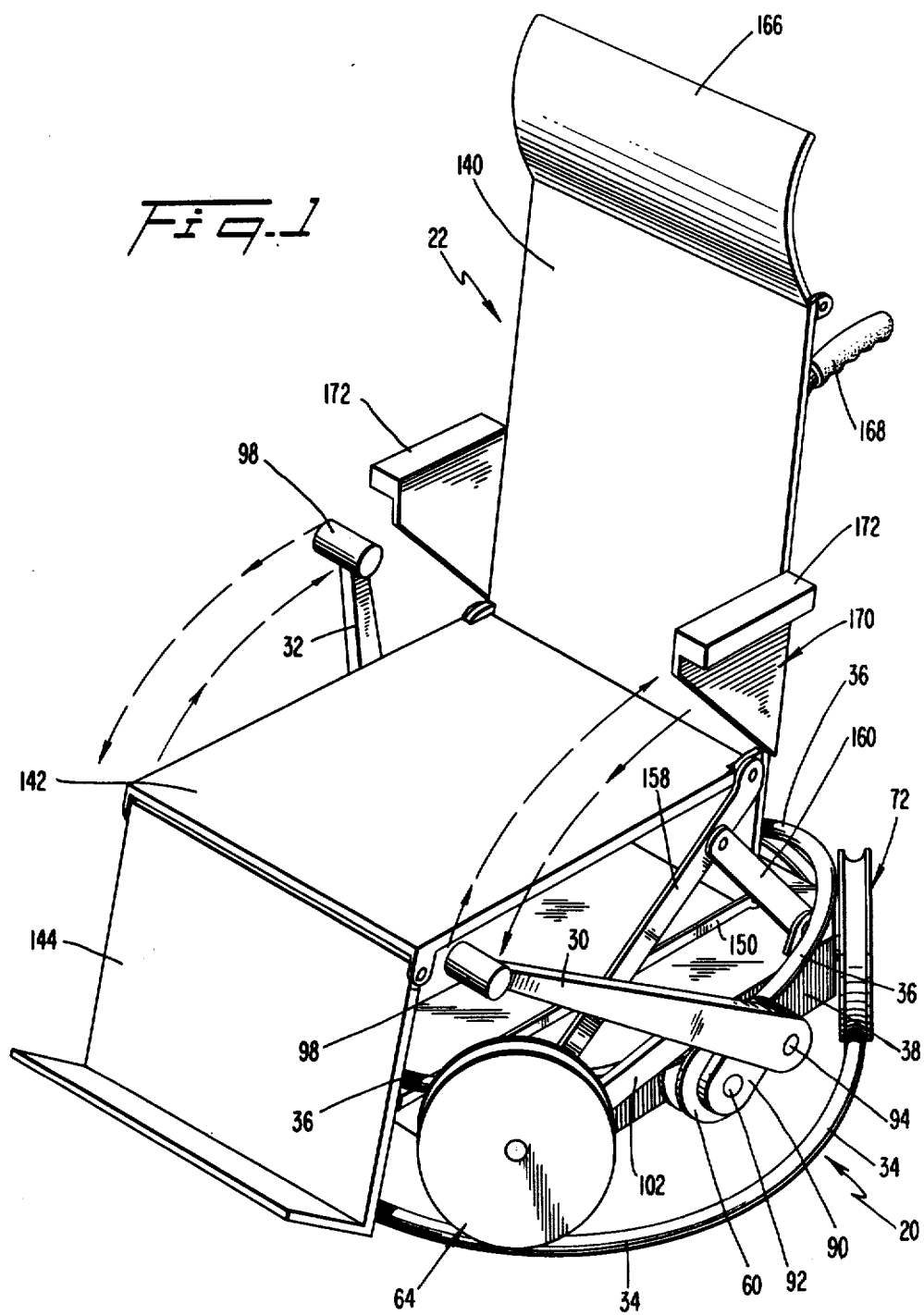

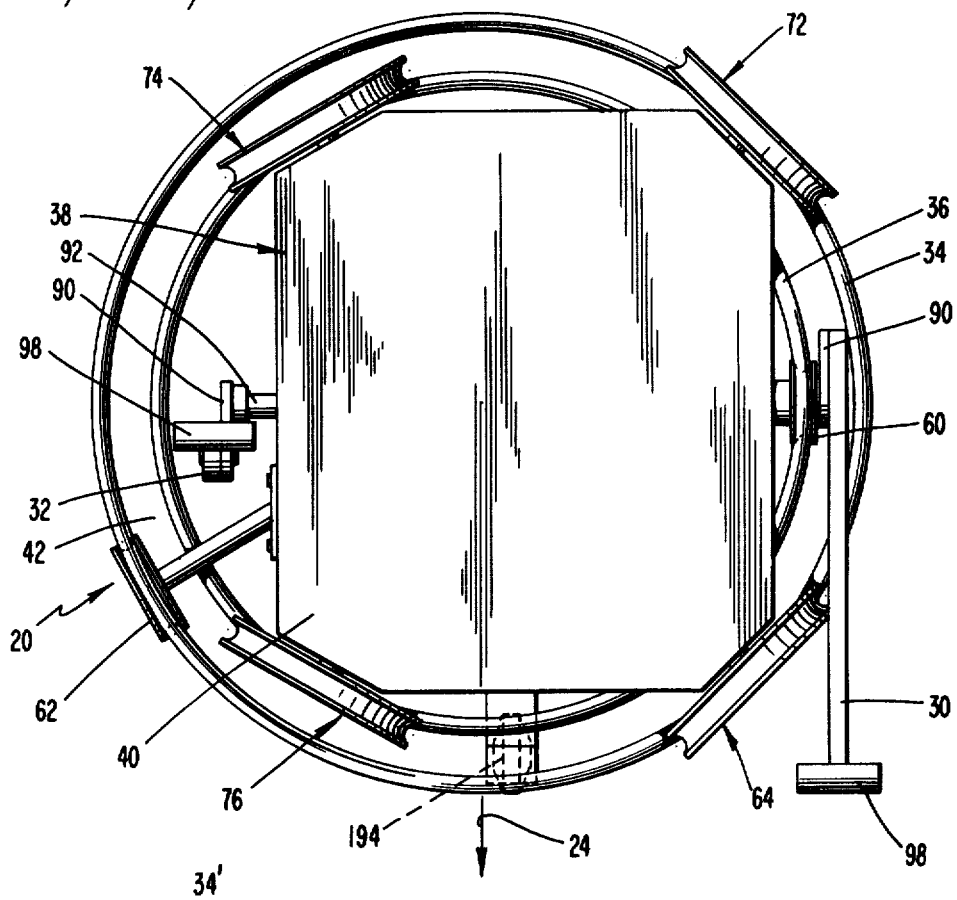
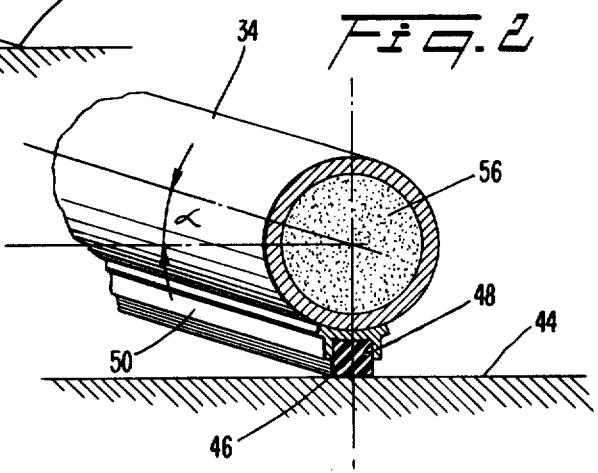

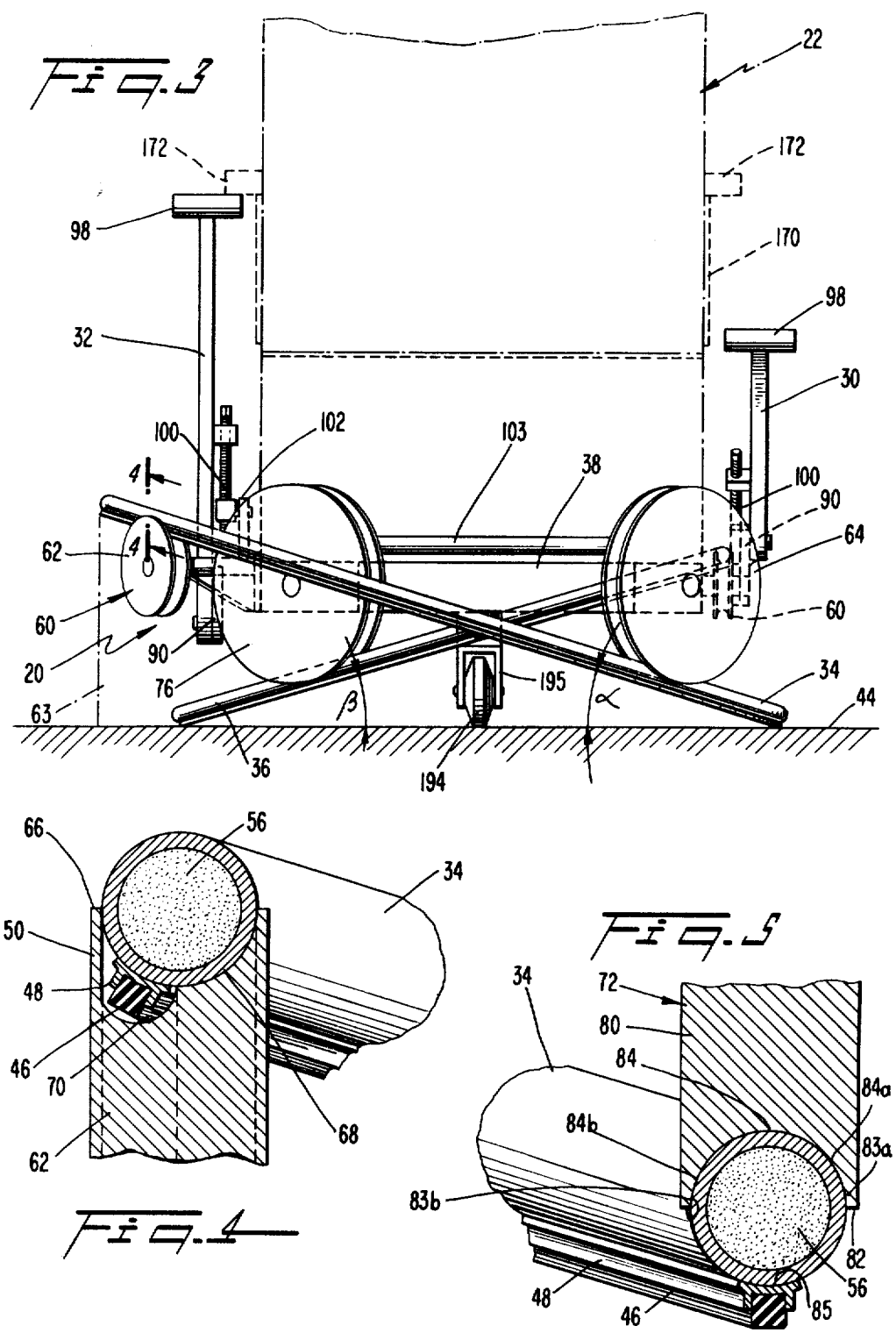

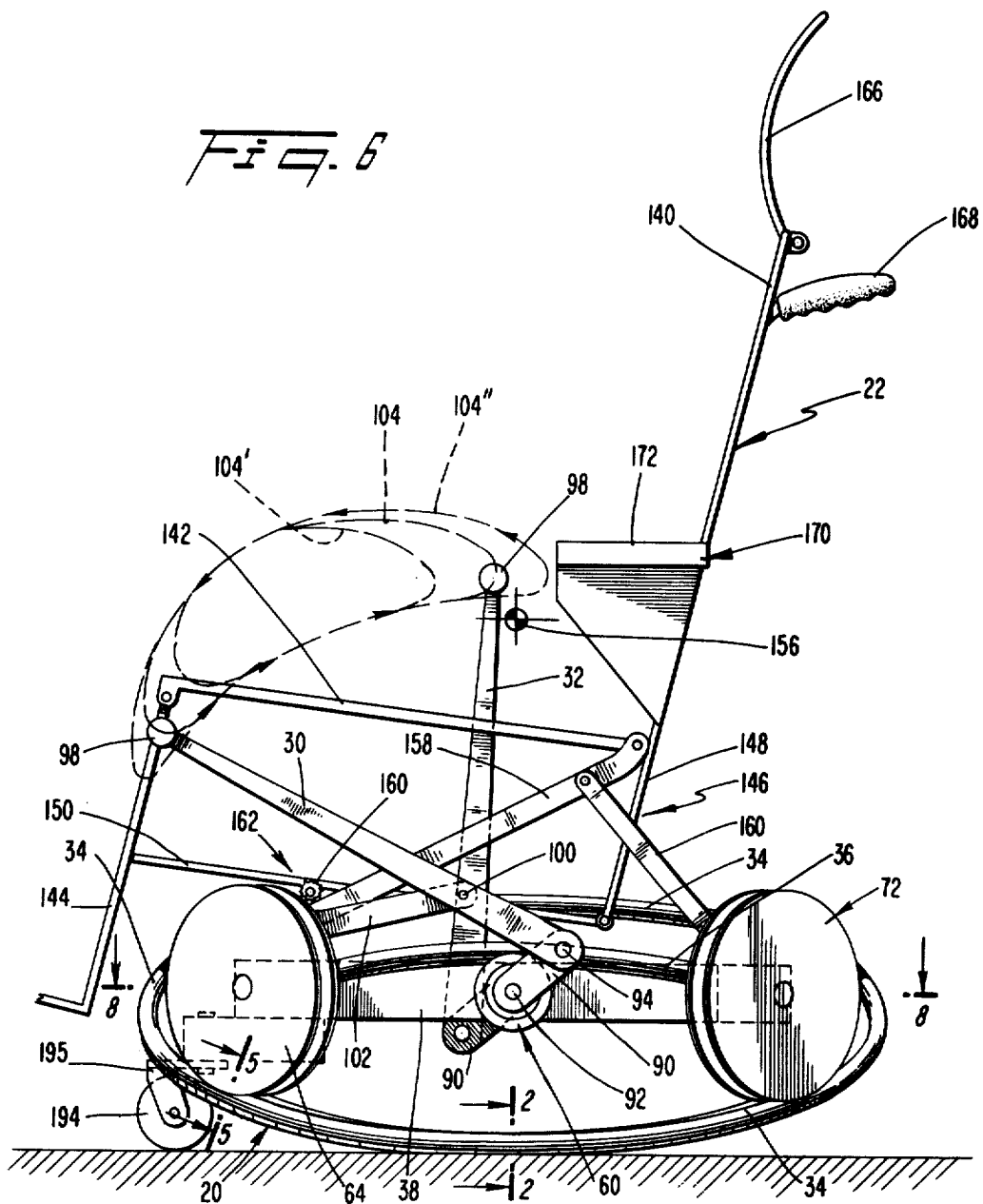

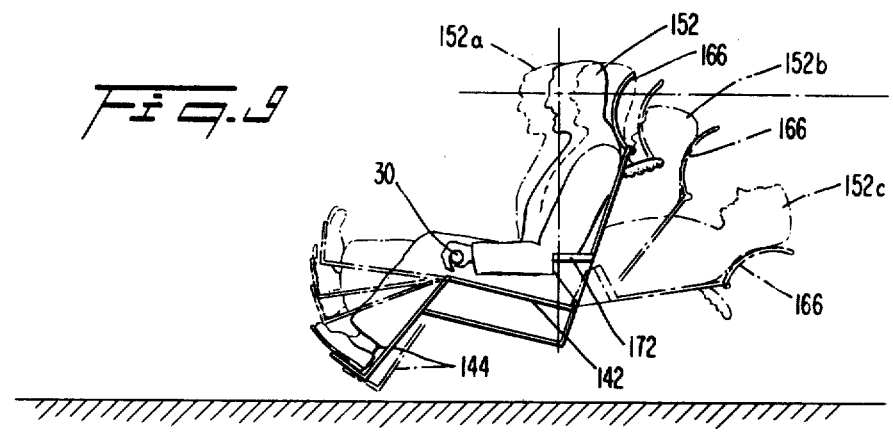
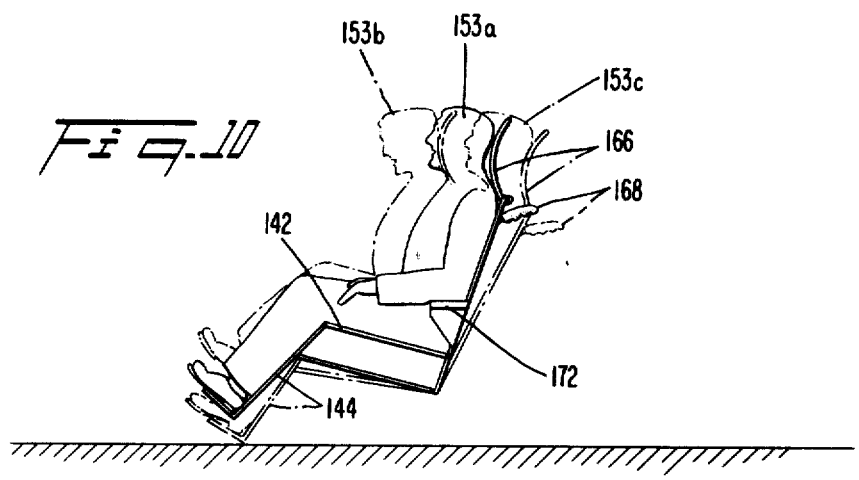
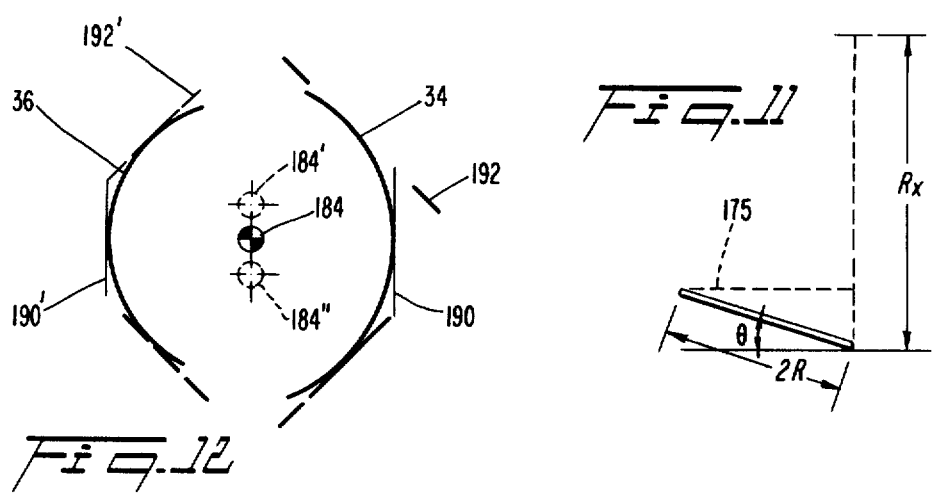

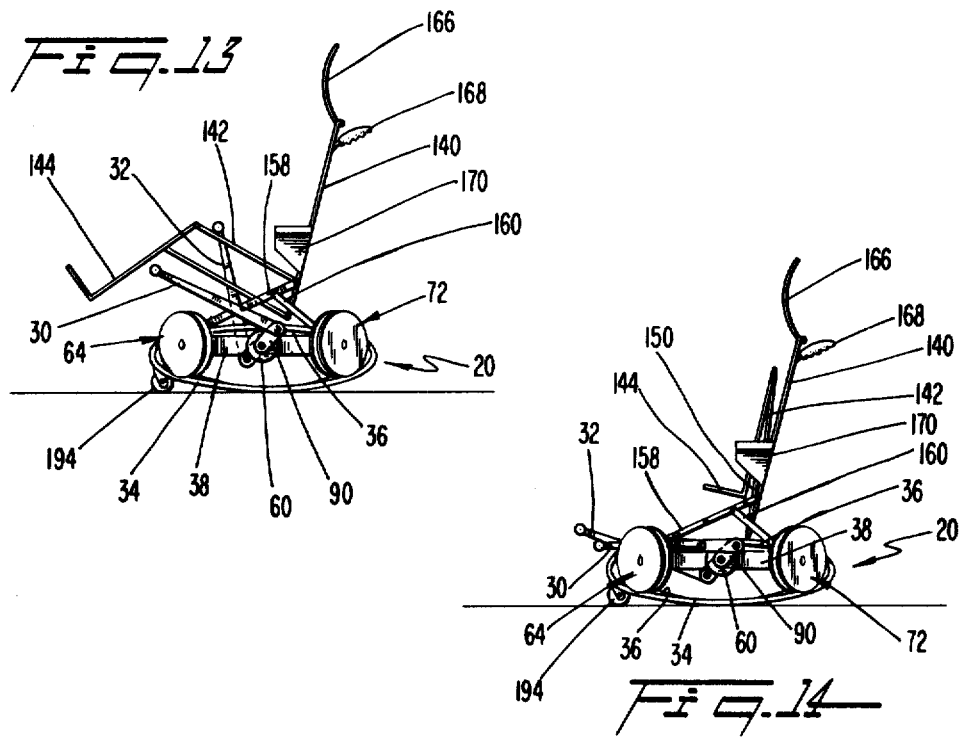
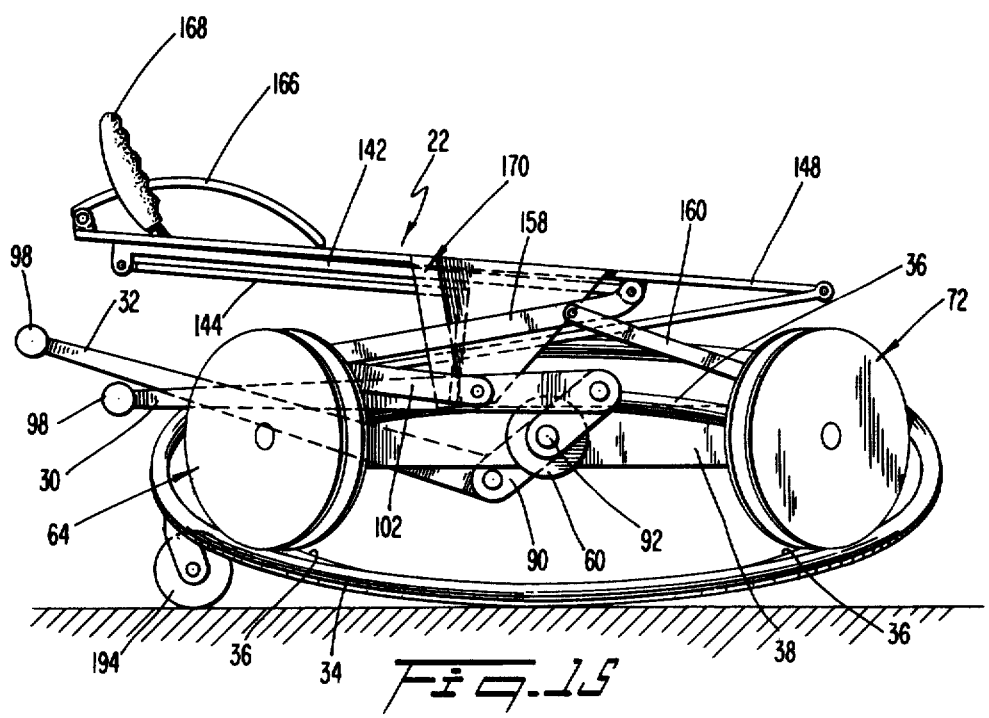

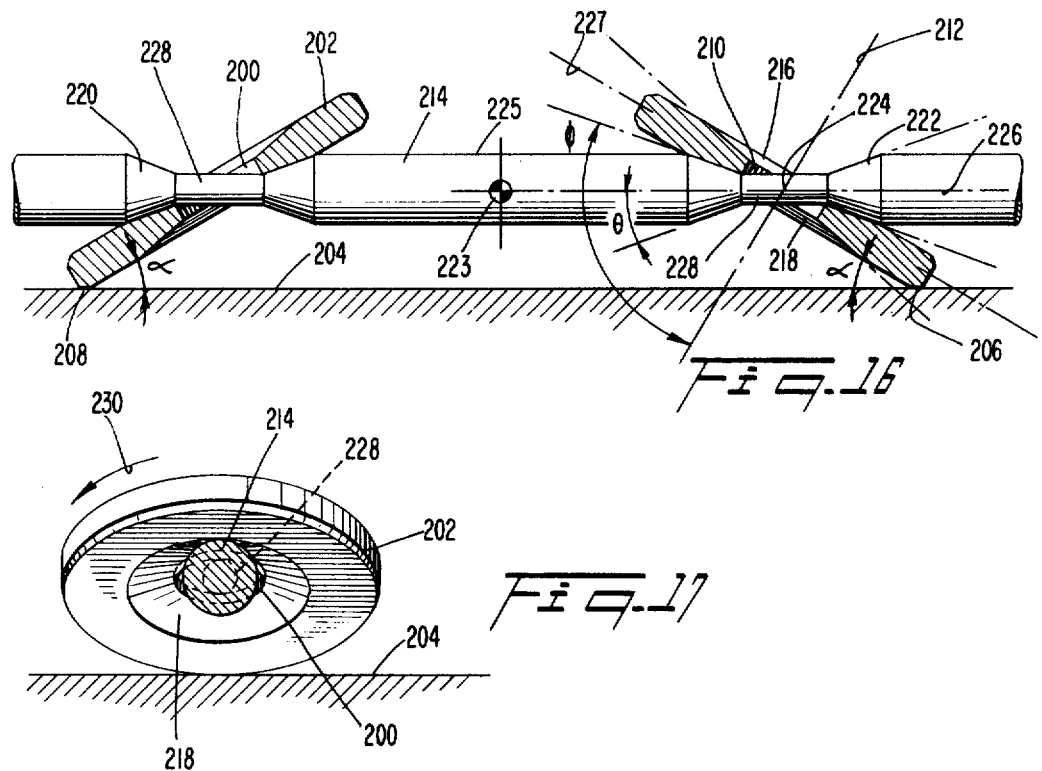
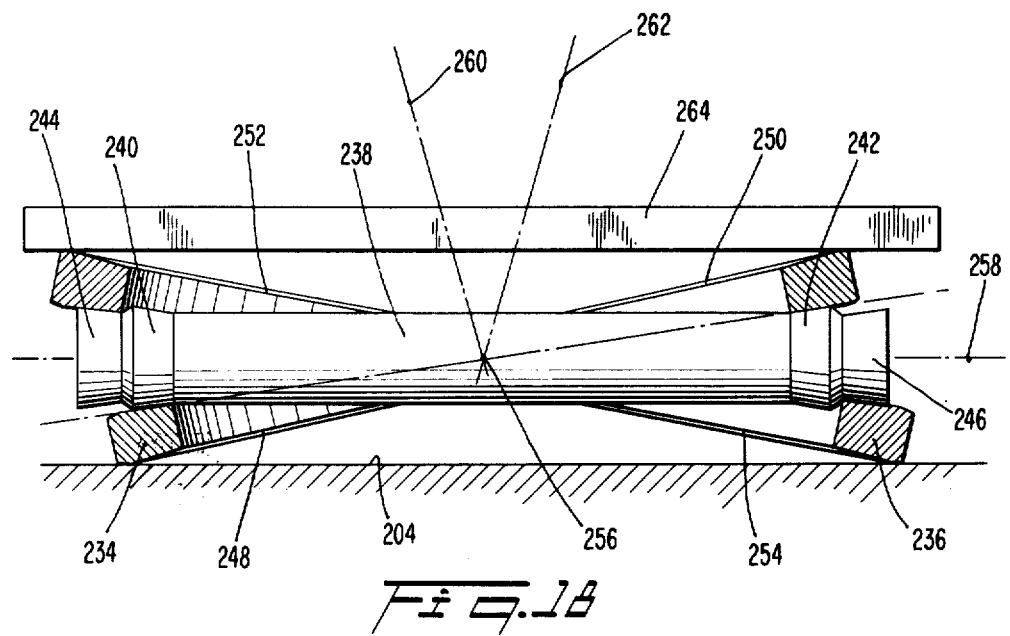

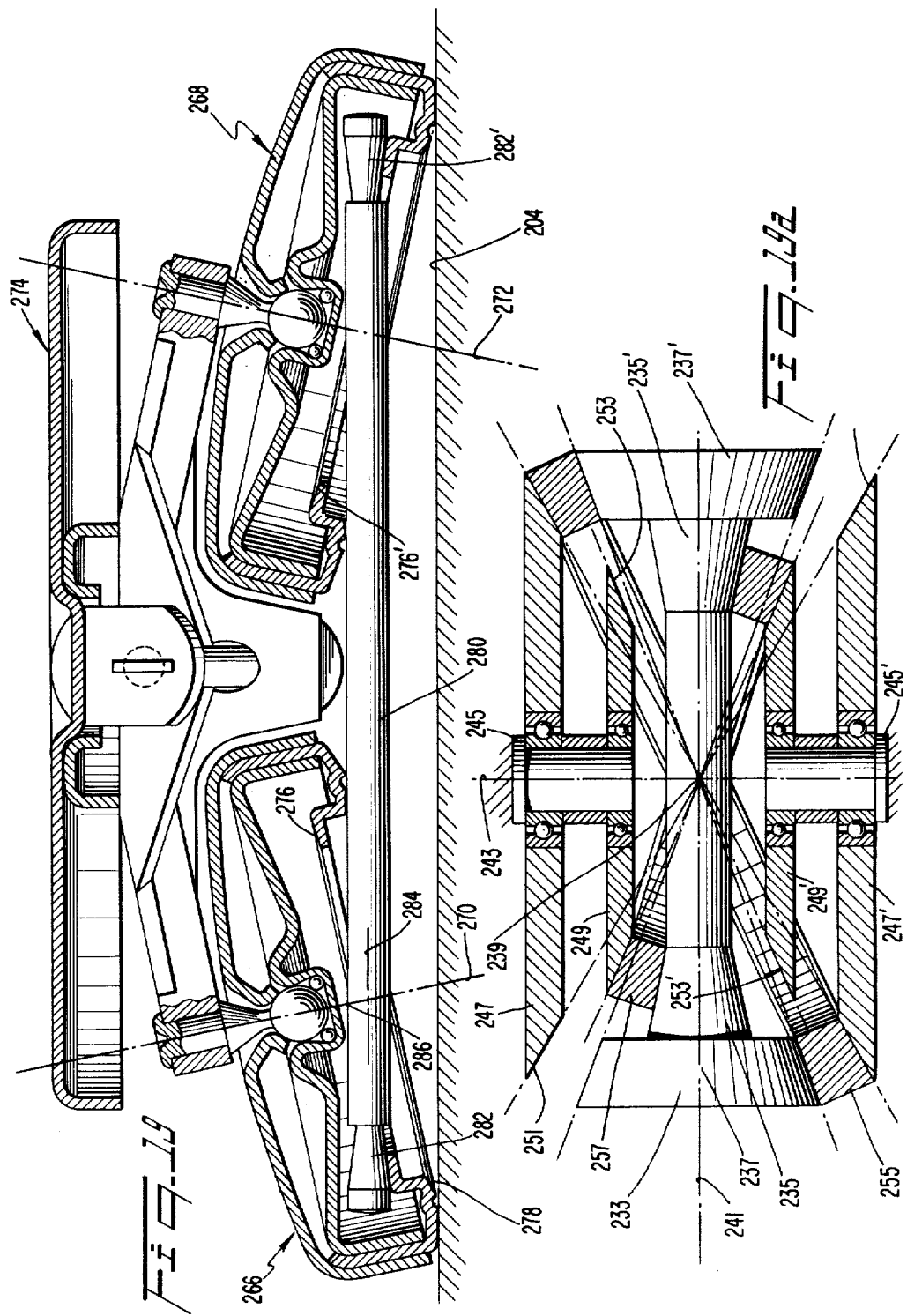

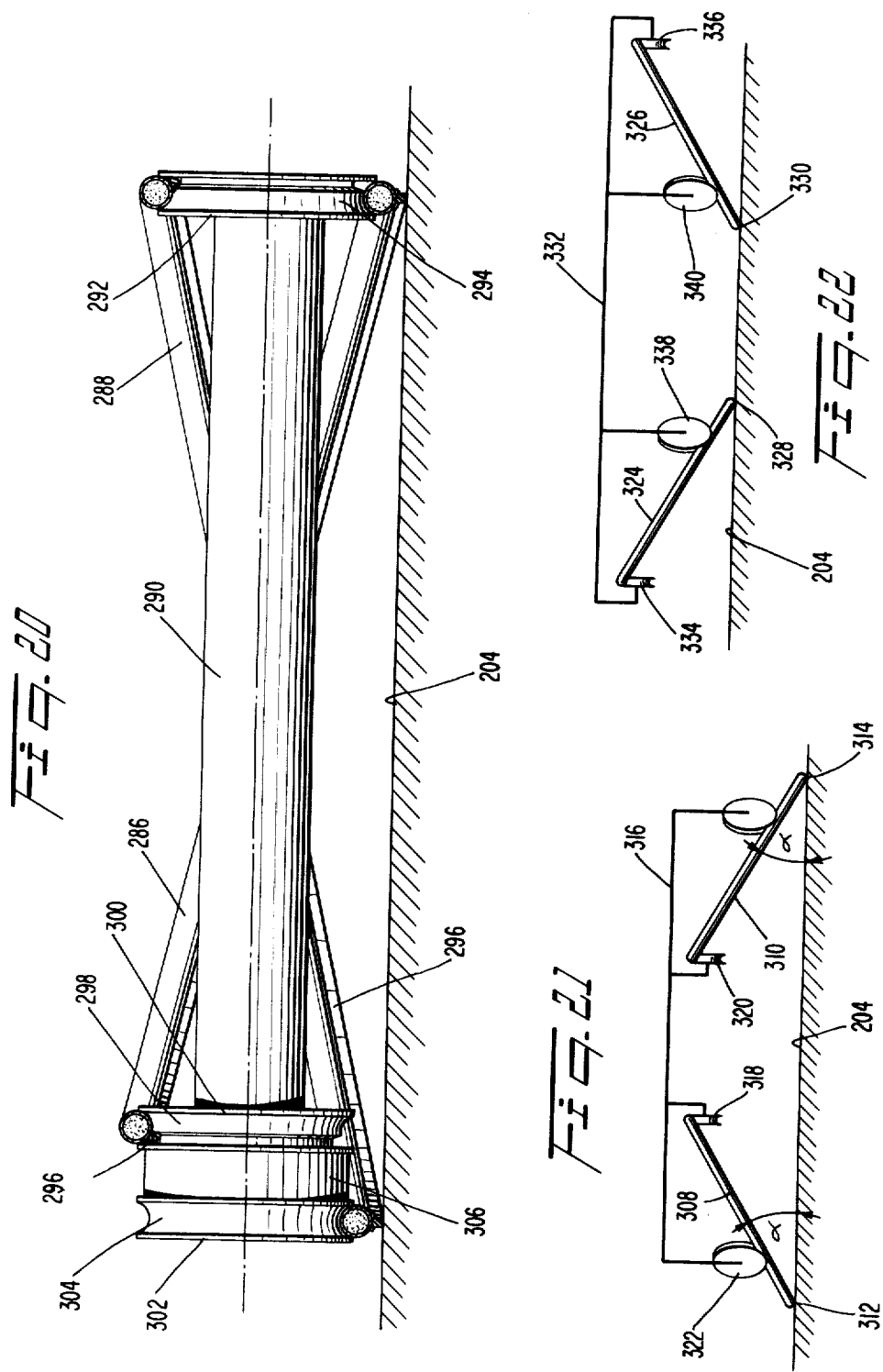

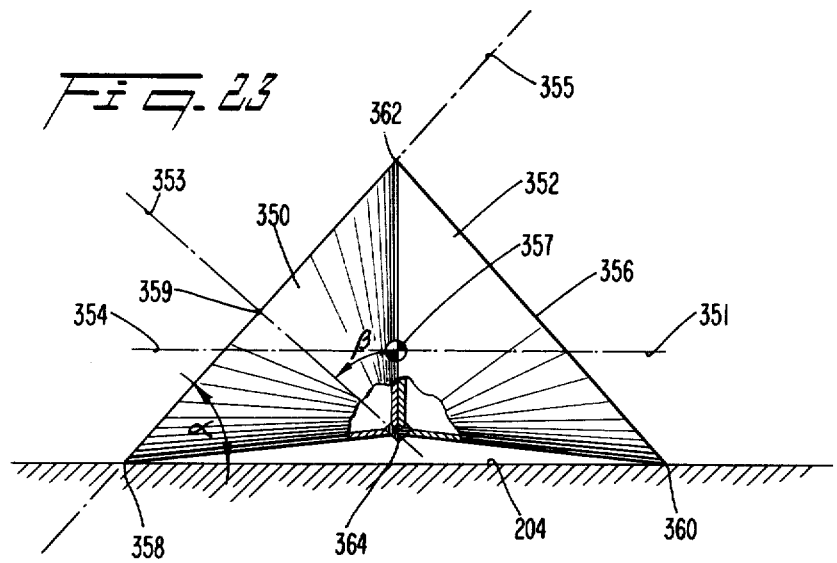
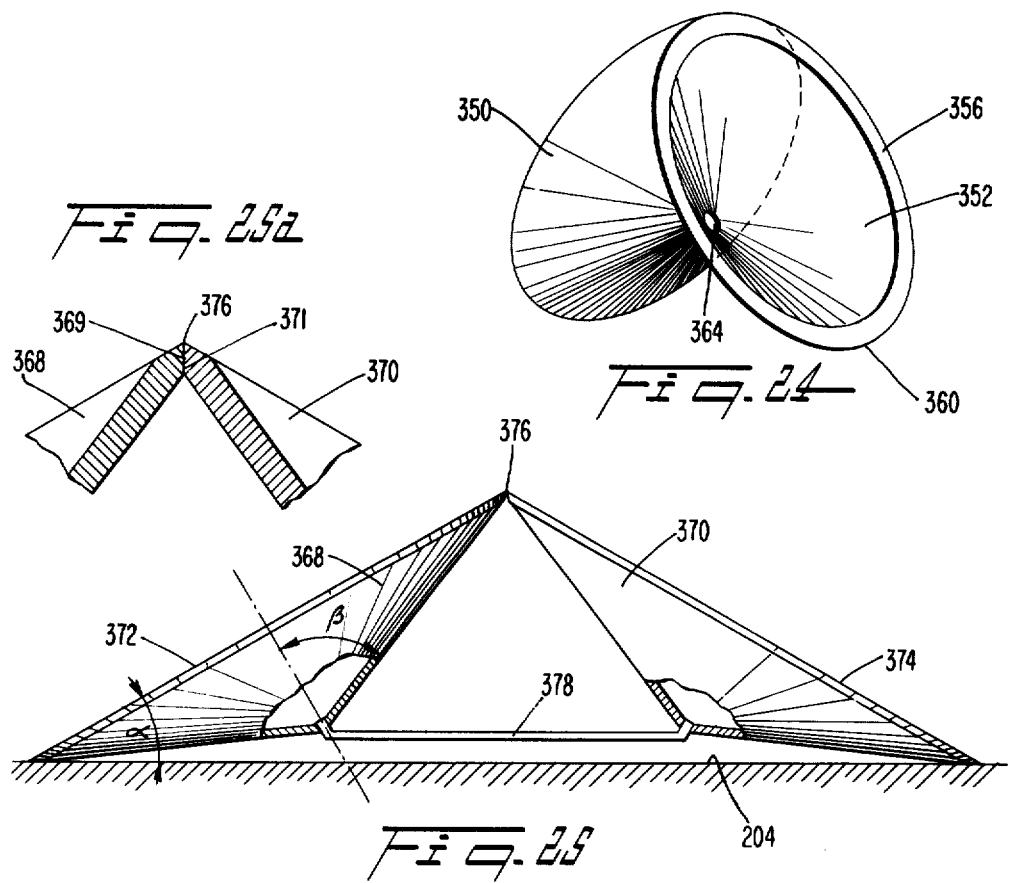

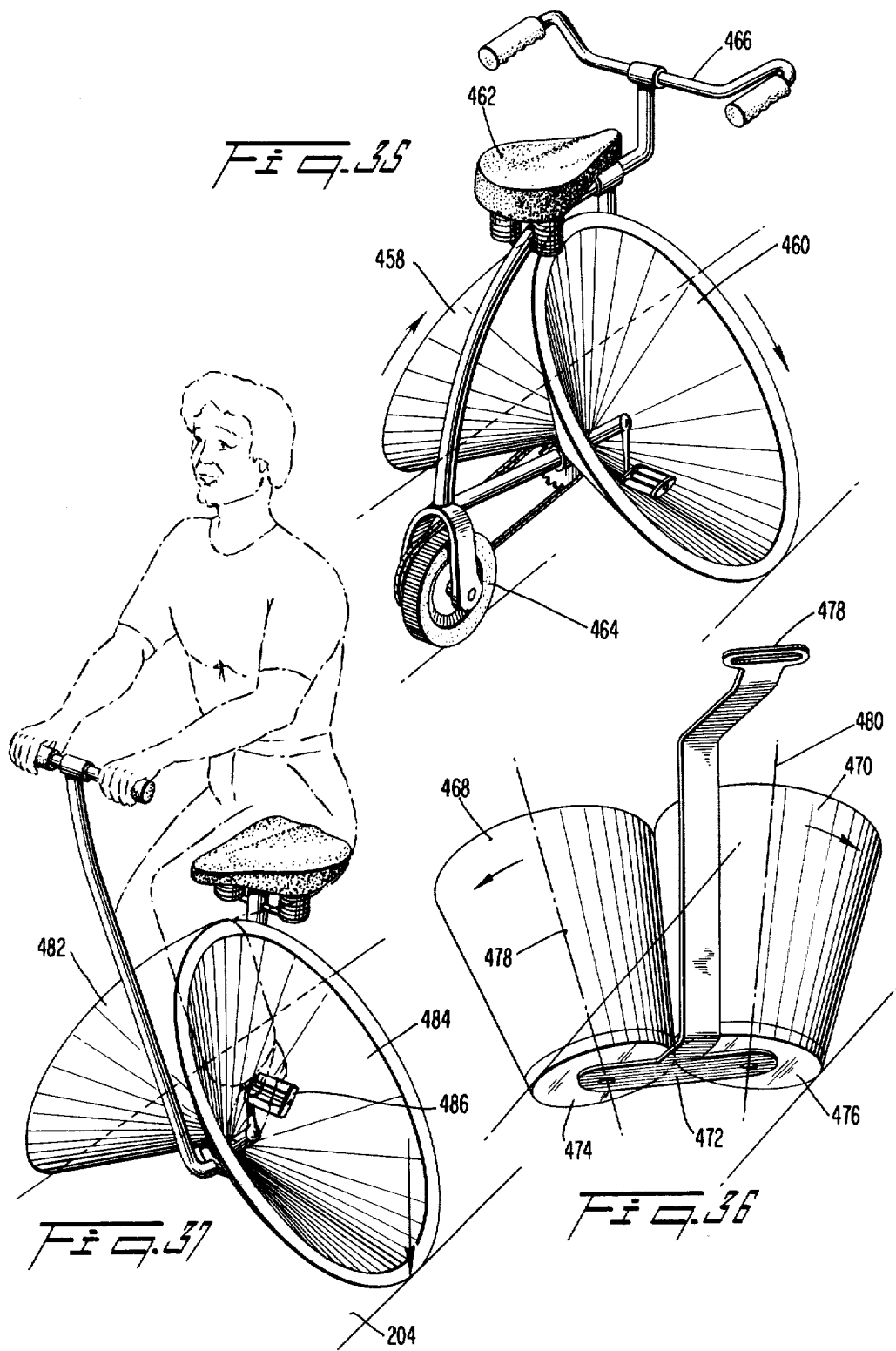

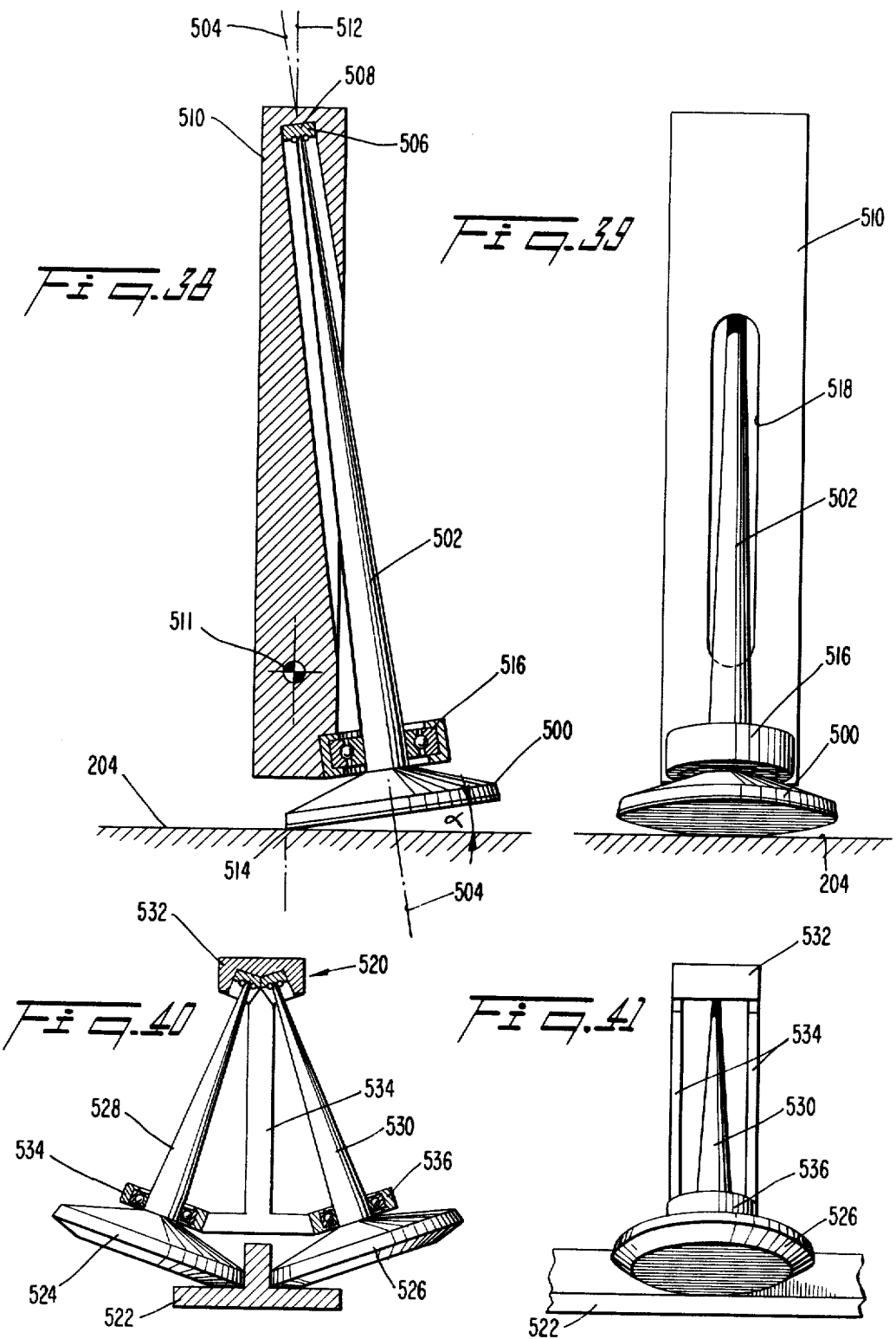

SUSPENSION SYSTEM

CROSS REFERENCE TO RELATED APPLICATION

This application is a continuation-in-part of United States Patent Application Ser. No. 953,843 filed Oct. 23, 1978 by Donald F. Wilkes entitled "Vehicular Suspension System".

BACKGROUND OF THE INVENTION

The present invention relates generally to a rolling support or suspension system. More particularly, the present invention concerns a rolling support system having canted rolling support members which exhibit very low friction.

Conventionally, rolling support systems utilize generally circular wheels mounted on a horizontal axle for rotation. These wheel-axle assemblies have positive stability against rotation about a horizontal axis perpendicular to the axle. However, the stability of the system to rotation about the axle axis is characterized as neutral. By virtue of this neutral stability, attempted rotations about the axle axis or displacements of the center of gravity for the system perpendicularly to the axle axis are each accompanied by movement of the system to a new point of stability. In addition, the wheel itself is unstable with respect to rotation relative to a horizontal axis through the wheel and perpendicular to the axle. Such a combination of characteristics is frequently considered to be undesirable and requires additional restraints to be built into the system to eliminate this undesired motion.

Another aspect of most conventional rolling suspension systems is the manner in which they carry force loads to the underlying surface: most employ radial bearings rather than thrust bearings. Since rolling elements in low friction radial bearings move into and out of the load bearing zone, there is a cyclical loading on the elements. Moreover, only a small portion of the rolling elements carry the load requiring comparatively large bearings. On the other hand, low friction thrust bearings use all rolling elements simultaneously for supporting the thrust load. As a consequence thrust bearings can be smaller and lighter. But in addition, thrust bearings have lower friction losses since the frictional forces act at smaller radii than comparable radial bearings.

For wheels mounted to rotate about a horizontal axis, the radius or diameter of the wheel controls the resistance to rolling caused by imperfections in the underlying support surface. For example, it will be seen that a one quarter inch vertical obstruction presents a virtually insurmountable obstacle to a wheel having a diameter of one half an inch; on the other hand, that same vertical obstruction of one quarter inch will present only a small perturbation to continuated rotation of a wheel having a diameter of ten inches.

Other kinds of rolling supports include caster assemblies which, when arranged in pairs, are also stable against a rotation about an axis perpendicular to a line connecting the two casters. However, casters are typically designed for rotation about a vertical axis such that horizontal forces cause the casters to assume a position trailing the vertical axis in the direction of movement. Since the load applied to a caster is a generally positioned in alignment with the vertical axis of rotation, these caster assemblies are unstable with respect to rotation about the line connecting the casters.

The foregoing discussion concerning the significance of vertical imperfections in the underlying support surface is particularly exacerbated for the known caster assemblies for the reason that such caster assemblies for the reason that such caster assemblies typically must fit unobtrusively under furniture or other heavy objects and, necessarily, are restricted to fairly small diameters. For example, caster wheels generally have a diameter of four inches or less.

A common rolling support system typically utilizes ball bearings or roller bearings to reduce the friction associated with applied loads normal to the underlying surface. Such bearing assemblies of necessity dissipate energy through sliding friction of the bearing elements relative to races of the bearing assembly. Such losses may be thought of as being associated with the failure to utilize pure rolling contact between all portions of the bearing surfaces and with the failure of various constraints to achieve perfect alignment of the rolling elements relative to the rolling axis of the bearing. Accordingly, higher power is necessary to cause movement of the support assemblies and greater reliance on lubricants and higher rates of wear pertain than would otherwise be experienced if a purer form of rolling contact between the supporting surfaces could be effectively maintained.

Over the years some variety has developed in conventional rolling support systems. For example, there exists a vehicle using inclined elliptical wheels that present a circular elevation. These vehicles track a sinusoidal path and are useful on soft terrain. See U.S. Pat. No. 3,363,713 issued Jan. 16, 1968 to J. E. Blonsky, and U.S. Pat. No. 2,683,495 issued July 13, 1854 to J. F. Kopzeynski. Both of these devices include differential gearing systems to aid negotiation of curved paths.

Vehicular supports with wheels tiltable about a transverse axis and rotatable about a fixed inclined axis are also known, see U.S. Pat. No. 3,001,601 issued Sept. 26, 1961 to E. P. Aghnides and U.S. Pat. No. 912,010 issued Feb. 9, 1909 to Martin.

Varied forms of rolling geometry have also been used in casters. For example, an inclined ground engaging wheel mounted for rotation in a plane oblique to the supporting surface has been used in combination with a conventional circular wheel which rides on an upper surface of the inclined wheel to support a vertical load. See for example U.S. Pat. No. 3,928,888 issued Dec. 30, 1975 to Lapham. Because of its eccentric geometry and the conventional circular wheel, such a device is not however inherently stable in any plane. Moreover, there is sliding contact between a conical bearing surface of the inclined wheel and a cylindrical bearing surface of the horizontally supported wheel.

Another caster assembly has also been disclosed which incorporates an inclined roller that is journal mounted to a caster supporting structure, see U.S. Pat. No. 3,161,907, issued Dec. 22, 1964, to Anthony. In this arrangement, substantial sliding friction is developed by virtue of the journal bearing arrangement. Moreover, there is a substantial identity between the actual radius of the rolling member and its effective radius as seen in the vertical plane. Thus, the caster does not exhibit enhanced advantages with respect to rolling over vertical imperfections in the underlying surface.

In view of the multifaceted discussion presented above, it will now be apparent to those skilled in the art that the need continues to exist for a rolling support system which overcomes problems of the type discussed.

SUMMARY OF THE INVENTION

By way of example and with no limitation to be intended or implied, some aspects of the invention will be briefly summarized.

In one aspect, the present invention provides a rolling support system which includes a pair of support members inclined relative to an underlying support surface and maintained in their relative positions by an interconnecting system. Each rolling support member has an effective radius which substantially exceeds its actual radius. Accordingly, a surface discontinuity, or imperfection, in the underlying surface has a comparatively insignificant effect on rolling characteristics of the assembly.

In addition, the rolling support member is arranged such that there is an integral rolling contact bearing between its surfaces mating with the interconnecting system thereby avoiding any sliding friction arising from the bearing portion of the assembly which resists translation of the assembly.

By virtue of the two spaced apart contact zones where the support members touch the underlying surface, the suspension system has self-righting stability against perturbations of the center of gravity in a vertical plane containing the contact zones. Moreover, the rolling suspension system has an inherent self-righting stability with respect to perturbations of the system center of gravity in a second vertical plane perpendicular to the first plane. The combination of these self-righting stabilities in perpendicular directions enhances the stability of the rolling support system and makes it useful for a wide variety of physical applications.

While many different embodiments are disclosed herein, each exhibits a very low frictional resistance to rolling motion by virtue of the purer rolling contact between mating surfaces and the absence or significant reduction of residual sliding friction components in the bearing portions of these embodiments.

In one specific embodiment, the rolling support system of the present invention functions as a self-acting differential. The differential assumes, automatically, whatever position may be required in order to match the angular velocities of the two rolling support members to a particular curved path which is being traversed by the assembly. In so doing, nearly pure rolling contact between mating surfaces of the support members and the differential member is maintained.

In another aspect, the present invention provides a pair of inclined members which are constrained to purely rectilinear motion. In one embodiment, these rolling supports take the form of annular disk-like support members. In another embodiment, the rolling supports take the appearance of hoops of circular or quadrilateral cross-section. In yet another embodiment, the rolling supports may assume either conical or frustoconical shape.

Another embodiment constrains the support members to move in a continually curving direction of uniform radius. A specific example of this embodiment includes a pair of conical members having dissimilar cone angles.

The rolling suspension system can also be designed to provide dominant stability either in the direction of motion, i.e. perpendicular to the plane containing the contact zones, or in a direction perpendicular to the direction of motion, i.e. within the plane of the contact zones. This arrangement can readily be effected by changing the location of the contact zones with respect to the center of the rolling suspension system from either a relatively wide spread position to a more closely spaced position and vice versa.

Specific applications of the geometry include such items as a novel bicycle configuration, novel tricycle configuration, a novel track riding assembly, shock absorbing caster members and the like.

BRIEF DESCRIPTION OF THE DRAWINGS

Many objects and advantages of the present invention will be apparent to those skilled in the art when this specification is read in conjunction with the drawings wherein like reference numerals have been applied to like elements and wherein:

FIG. 1a is a plan view of the wheelchair with the seat removed to show the rolling suspension system;

FIG. 1b is a schematic view of forces acting on a canted hoop;

FIG. 2 is an enlarged cross-sectional view taken along the line 2—2 of FIG. 6;

FIG. 3 is a front elevational view with the seat illustrated in phantom lines;

FIG. 4 is an enlarged partial cross-sectional view taken along the line 4—4 of FIG. 3;

FIG. 5 is an enlarged partial cross-sectional view taken along the line 5—5 of FIG. 6;

FIG. 6 is a side elevational view of the wheelchair;

FIG. 7 is a schematic view illustrating the operation and adjustment of the drive mechanism;

FIG. 9 is a schematic view illustrating operation of the seat articulation assembly;

FIG. 10 is a schematic view illustrating rocking of the seat assembly;

FIG. 11 is a schematic illustration of the relationship between the actual and apparent radii of curvature for an inclined hoop;

FIG. 12 is a schematic view of hoop tangents at the point of ground contact during forward and rearward excursions of the center of gravity;

FIGS. 13 and 14 are schematic views showing progressive collapse of the seat assembly;

FIG. 15 is a side elevational view of the collapsed wheelchair;

FIG. 16 is a front elevational view of a general embodiment of the present invention;

FIG. 17 is a side elevational view of the embodiment of FIG. 16;

FIG. 18 is a front elevational view of another embodiment of the present invention in which the radial thickness of the support members is small in comparison to the diameter thereof;

FIG. 19 is a partial cross-sectional view of another embodiment of the invention in which the rotary members are mounted on an axially translatable rod along its longitudinal axis;

FIG. 19a is a partial cross-sectional view of an embodiment in which the rotatable elements are self-reacted;

FIG. 20 is a front elevational view in partial section of a nested annular hoop embodiment which is also equipped with a simple friction differential to permit curved paths as well as straight paths to be followed;

FIG. 21 is a schematic illustration of a different annular hoop embodiment in which lateral stability predominates;

FIG. 22 is a schematic illustration of another annular hoop embodiment in which longitudinal stability predominates over lateral stability;

FIG. 23 is a front elevational view of a rolling support assembly utilizing a pair of inclined conical members;

FIG. 24 is a perspective view of the assembly of FIG. 23;

FIG. 25 is a front elevational view in partial cross section of a rolling support assembly using a pair of cones having apex angle substantially in excess of 90° with peripheral contact;

FIG. 25a is an enlarged detail view of a possible connection assembly for the embodiment of FIG. 25;

FIG. 35 is a perspective view of a tricycle using a pair of conical rolling supports;

FIG. 36 is a perspective view of a container moving assembly using a pair of frusto-conical containers;

FIG. 37 is a schematic view of a bicycle incorporating a pair of elastically distortable conical rolling supports;

FIG. 38 is a partial cross-sectional view through a rolling support suitable for use as a caster;

FIG. 39 is a side elevational view of the embodiment of FIG. 38;

FIG. 40 is a front elevational view in partial cross-section of a rail-riding rolling support assembly;

FIG. 41 is a side elevational view of the embodiment of FIG. 40;

DESCRIPTION OF THE PREFERRED EMBODIMENTS

Before discussing the broader aspects of this invention, it will be useful to consider a specific application of the invention and some of the advantages which thus become available. A wheelchair for handicapped persons can be provided with desirable characteristics not presently available by considering special needs of handicapped individuals and using a fresh design approach incorporating this novel rollable support assembly or suspension system.

Figure 1:
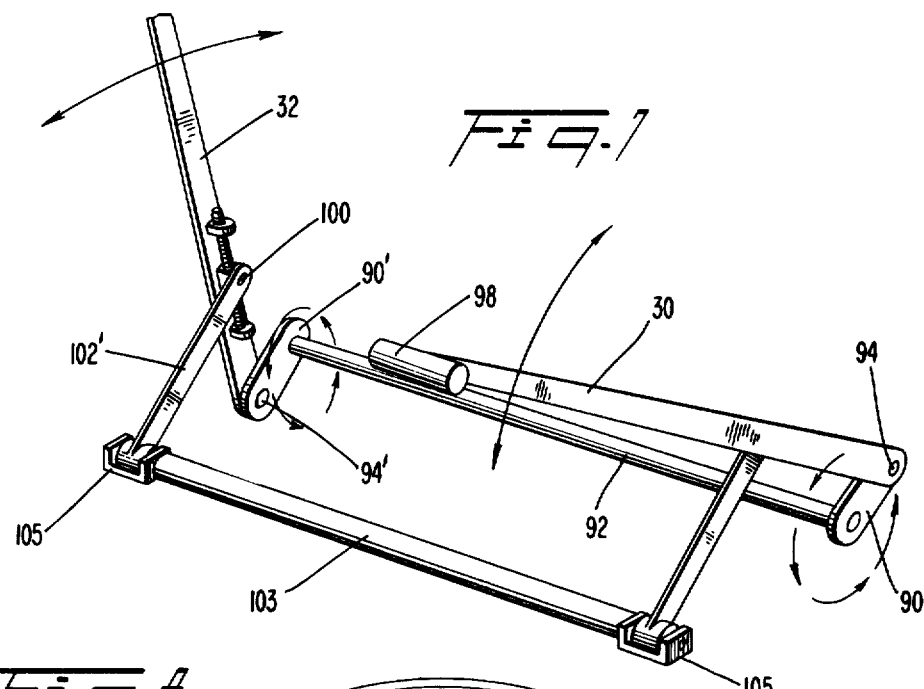
FIG. 1 is a perspective view of a wheelchair in accordance with the present invention.

A wheelchair in accordance with the present invention (see FIG. 1) includes a rolling suspension assembly 20 upon which an articulatable seat assembly 22 is releasably mounted. The wheelchair design aids a disabled person having use of at least one arm to perform a wide variety of maneuvers. Moreover, the wheelchair design has sensitivity to the occupant's comfort and convenience.

Basically, the wheelchair is adapted for movement along the straight line in the direction of the arrow 26 which is longitudinally oriented with respect to the seat assembly 22 as well as the rolling suspension assembly 20. However, the rolling suspension assembly 20 also permits the wheelchair to pivot about a vertical axis 24 through an angle of 360° or more, to climb vertical obstacles (such as curbs, sudden floor level changes and the like), to negotiate curved paths, to be propelled over a wide range of speeds and to easily traverse soft underlying surface conditions or sloped surfaces. The rolling suspension system 20 also has universal applicability as a support for a vehicle.

The wheelchair is provided with a locomotion or propulsion assembly 28 which includes a pair of lever assemblies 30, 32 that are each manually operated by an occupant seated in the wheelchair. One lever assembly 30 is provided on the left side of the chair occupant; whereas the second lever assembly 32 is located on the right side of the occupant. In order to accommodate those persons who have use of only one arm, the driving assembly 28 will propel the chair in the direction of the arrow 26 or as steered by a dominant hand steering control when one or both of the lever assemblies 30, 32 are manipulated. In the event that only one good arm is available for locomotion, the lever on the other side counterbalances the driven lever assembly and may provide passive exercise for the poor arm if the hand or arm stump of the poor arm grips, is tied or otherwise secured to the lever handle.

ROLLING SUSPENSION SYSTEM

The rolling suspension system 20 includes a pair of generally planar hoops 34, 36 each of which engages or otherwise touches the ground or another suitable supporting surface upon which the chair can roll. These hoops 34, 36 support the chair at corresponding contact zones on the supporting surface and are the rolling supports for the suspension system 20. To this end, each hoop 34, 36 rotates in a corresponding plane during suspension system movement and cooperates with a frame 38 to support the seat assembly 22. A supporting assembly is provided on the frame 38 to support at least one portion of the hoop in a position elevated above the supporting surface. In addition, the frame 38 includes an assembly for supporting the frame itself upon the pair of hoops during the movement of the wheelchair as well as during stationary use of the wheelchair.

The drive assembly 28 includes a differential gearing system that permits the two hoops 34, 36 to be driven in opposite rotational directions during straight line movement of the chair, at different rotational rates during negotiation of a curve, and in the same rotational direction during rotation of the chair about the vertical axis 26.

In order to more clearly understand the structural features of the rolling suspension system 20 and the seat assembly 22, each of the primary features will now be described in detail.

FRAME

The frame assembly 38 (see FIG. 1a) provides a means for interconnecting the hoops 34, 36 and for maintaining the spatial relationship therebetween. The frame assembly 38 has a generally flat upper surface 40 for supporting the seat assembly and a plurality of sides extending downwardly from the peripheral edge 41 thereof to provide mounting surfaces for other components. An enclosure for a differential gearing system is also provided by the frame 38.

The flat upper surface 40 provides a simple surface upon which the seat assembly 22 (see FIG. 1) may be mounted. Alternatively, any other type of vehicle may be supported by the rolling suspension system 20. Accordingly, it is expressly intended that the discussion of this rolling suspension system be viewed as applicable to any one of a wide variety of vehicles including, but not restricted to, wheelchairs.

The peripheral edge 41 of the frame 38 is configured as a polygon (see FIG. 1a), and specifically a quadrilateral. Such a configuration allows the frame to extend far enough laterally and longitudinally to support the various structural elements and bearings required by the rolling suspension system 20 so as to provide a stable surface for vehicular support.

Extending forwardly from a lower portion of the frame 38 is a caster assembly 194. This caster assembly 194 includes a clevis mounted rotatable wheel (see FIG. 3). The clevis 195 is itself mounted for rotation about a horizontal axis so that the caster wheel can move between two positions: one position engaging the supporting surface 44; and a second position spaced above the supporting surface so as to be free of contact therewith.

If desired, the frame 38 need only be deep enough to enclose a driving mechanism for the hoops. The caster assembly 194 would thus be mounted on the bottom of the frame 38 and with other members being mounted either above or below the frame 38.

GROUND-ENGAGING HOOPS

As may be seen from FIG. 1a, each of the ground-engaging hoops 34, 36 is generally circular in nature. Each of the hoops 34, 36 appears slightly elliptical in this top view as illustrated in FIG. 1a with a major axis generally parallel to the longitudinal direction 24 and a minor axis generally perpendicular or transverse thereto. Each generally circular hoop 34, 36 is inclined relative to a supporting surface such as the ground and, when viewed from above, this inclination causes the slightly elliptical appearance to the hoops 34, 36. Each hoop 34, 36 is preferably fabricated in a toroidal shape from a tubular member (see FIG. 2) having a circular cross section with uniform wall thickness. Alternately, the cross section may include an integrally formed tire recess feature. If an integral tire retention recess is formed into the tire cross section usually an extra symmetrically located redundant recess is also required to maintain balanced bending stiffness and thereby avoid a tendency to twist when it is bent into the circular hoop shape. Symmetry of the annular cross section provides uniform bending characteristics to the hoop 34 to allow the hoop to be formed from a tubular member.

The hoop 34 is vertically spaced above the supporting surface 44 and is mounted in a groove 48 of a tire mounting bead 50. This tire mounting bead 50 may be welded or otherwise suitably secured around the peripheral surface of the hoop 34 such that the tire 46 will be disposed vertically on a line 52 passing through the center of the tubular cross section. In this manner, the tire 46 rests perpendicularly on the surface 44 and will be in compressive bearing engagement with the supporting surface 44 when that portion of the hoop immediately thereabove is closest to the supporting surface 44. The primary purpose of the rubber tire is to provide a high coefficient of friction for traction. Moreover, the tire 46 cushions the hoop against impulsive forces and allows quiet movement of the rolling suspension system 22. One advantage of the mounting bead 50 is that it can be roll formed in an inexpensive manner from sheet stock.

The interior portion of each hoop 34 may be filled with a suitable conventional sound dampening material 56. This material dampens acoustical frequency vibrations of the tubular cross section that might otherwise sustain regenerative acoustical noise. Of course, sound attenuation is also enhanced by the presence of the tire 46 fashioned from a synthetic resinous material, rubber, or a similar material. As a result of hoop construction, small obstructions on the supporting surface 44 do not give rise to direct contact with the tubular cross section of the hoop 34.

The centerline of each hoop 34, 36 (see FIG. 3) lies within and defines a corresponding inclined plane. The plane of hoop 34 is inclined at an acute angle $\alpha$ with respect to the supporting surface 44. Similarly, the plane of the other hoop 36 is inclined relative to the supporting surface 44 by an acute angle $\beta$. In addition, the plane of the hoop 34 intersects the plane of the hoop 36 at a location beneath the seat assembly 22. These intersecting planes define an imaginary straight line which runs in the longitudinal direction of the rolling suspension system 20 and is spaced above the supporting surface 44 so as to be generally parallel thereto.

The angles $\alpha$, $\beta$ defined between the supporting surface 44 and the first, or prominent, hoop 34 and the second, or protected, hoop 36 may be equal or may be selected at any desired value. The criteria for selecting the angles $\alpha$, $\beta$ basically relate to necessary operating characteristics for a vehicle supported by the rolling suspension system 20. For example, the wheelchair must be capable of passing through conventional doorways having a width of approximately 30 inches. Therefore, the maximum lateral distance between the side portions of the prominent hoop 34 must be less than 30 inches in order to permit passage through doorways.

Another important factor in determining the inclination angles $\alpha$, $\beta$ is placement of the apparent radius of curvature for the hoops 34, 36. In elevation (see FIG. 6) the hoops 34, 36 present an elliptical profile with a major axis whose length is the hoop diameter d and a minor axis whose length is D sin $\alpha$ (or D sin $\beta$). It can however be analytically demonstrated that the radius of curvature for such an ellipse at a point on the minor axis is R/sin $\beta$. Thus the apparent radius of curvature exceeds the radius of the hoop itself. To provide self-righting stability, the apparent radius of curvature must be positioned above the combined center of gravity for the wheelchair and its occupant.

The angle of inclination a (see FIG. 3) for the protected hoop 36 may be selected so that mechanical elements of the driving mechanism can lie within a common plane.

During forward movement of the rolling suspension system 20, each hoop 34, 36 rotates about its center in its respective plane: the prominent hoop 34 (see FIG. 1a) rotates in a counterclockwise direction; whereas, the protected hoop 36 rotates in a clockwise direction. During straight horizontal movement of the rolling suspension assembly 20, the surface speed of both the prominent hoop 34 and the protected hoop 36 is the same. Accordingly, since the diameter of the prominent hoop 34 exceeds the diameter of the protected hoop 36 in order to permit the nested relationship between the two hoops, the angular velocity of the prominent hoop 34 in its plane will be lower than the angular velocity of the protected hoop 36 in its plane.

It is also to be noted that the rolling suspension system 20 is capable of movement about a vertical axis. In this operational mode, both the prominent hoop 34 and the protected hoop 36 rotate in the same directional sense relative to the frame 38. This movement is in fact a relative movement between the hoops 34, 36 and the frame 38: for example, the hoops actually rotate very little relative to the supporting surface whereas the frame 38 itself would rotate much more quickly about its vertical axis relative to the supporting surface.

For the hoops to obtain the nested relationship described above, it will be apparent that at least the prominent hoop essentially comprises an annular toroidal ring devoid of spokes, webs, or similar structural members extending from the periphery of the hoop toward its center of rotation. Moreover, this nested relationship makes a laterally compact assembly.

HOOP SUPPORT ASSEMBLY

As noted above, each hoop 34, 36 is supported in its inclined orientation (see FIG. 3) relative to the underlying support surface 44. To maintain the inclined orientation of each hoop 34, 36, a hoop support assembly 60 is provided for each hoop 34, 36. The primary function of the hoop support assembly 60 is to maintain one portion of the corresponding hoop at a substantial elevation relative to the supported surface 44. To effect this result, each hoop supporting assembly 60 is preferably carried by the frame 38 in a position underlying the corresponding hoop remote from the point of contact between the hoop and the support surface 44.

The support assembly for each hoop may, for example, comprise a generally circular idling wheel 62 mounted on a shaft suitably supported from the frame 38. The idling wheel 62 is not required to resist a particularly large force due to leverage provided by the hoop. More particularly (see FIG. 1 b), a force 64' is exerted on the hoop 34' by the combined weight of the wheelchair and its occupant. This force 64' is supported by the inclined hoop 34' and is applied at a position fairly close to the point 66' at which the hoop 34 contacts the supporting surface 44'. From elementary engineering principles, the magnitude of the reacting force 62' which must be exerted by the idling wheel 62 is substantially less than the magnitude of the force 64' generated by the weight. Accordingly, it will be seen that the hoop functions as a lever about the point of ground contact 66'.

In the actual rolling support assembly 20 (see FIG. 3), each hoop 34, 36 supports about half of the combined chair-occupant weight. Accordingly, it will be seen that with the lever effect, the idling wheel 62 of the prominent hoop 34 may support only, for example, one eighth of the force supplied to the hoop 34 by the frame support means 64 or one sixteenth of the combined weight. Corresponding considerations also apply for the protected hoop 36.

The idling wheel 62 for the dominant hoop 34 (see FIG. 1a) is, in the plan view, positioned forwardly of the minor axis of the dominant hoop 34. In a simple rolling suspension system, this idling wheel 62 may be positioned precisely on the minor axis of the dominent hoop 34. But, for a wheelchair application, it is preferably located forwardly of the minor axis to enhance the obstacle climbing capabilities of the wheelchair. In this connection, the idling wheel 62 (see FIG. 3) should be positioned so that a vertical line 63 dropped from the prominent hoop 34 at its maximum elevation above the supporting surface 44 is free of interference from the idling wheel 62.

As shown in FIG. 4, each idler wheel 62 includes a peripheral surface 66 that is cylindrical and is provided with a hoop-receiving groove 68. At least a portion of this hoop-receiving groove 68 is adapted to directly engage and support the external surface of the tubular portion of the hoop 34. In addition, the groove 68 may include an undercut portion 70 that provides a relieved area to receive the tire 46 as well as its supporting bead 50. The undercut portion 70 avoids scuffing between the groove 68 and the tire 46 with its support 48. The idler wheel for the protected hoop 36 is constructed essentially in an identical fashion to the idler wheel 62 for the prominent hoop 34, but is physically positioned on the other side of the frame means 38 on the minor axis of the protected hoop 36.

FRAME SUPPORT ASSEMBLY

The frame 38 (see FIG. 1a) also carries a plurality of frame support assemblies 64, 72, 74, 76. Each frame support assembly is mounted at a side surface of the frame 38 and engages a corresponding hoop 34, 36. Specifically, the frame support assemblies 64, 72 engage the prominent hoop 34; whereas, the frame support assemblies 74, 76 engage the protected hoop 36.

As shown most clearly in FIG. 1a, the point of tangential contact between each of the frame support assemblies and the corresponding hoop occurs such that a generally quadrilateral area is defined between these contact points. This quadrilateral area defines a stabilization arrangement to safely support a wheelchair seat assembly against tipping. Provided that the combined center of gravity for the occupant and the wheelchair assembly falls within this quadrilateral area, the wheelchair will be stable against tipping both laterally and longitudinally. Moreover, with the self-righting characteristic discussed above, the wheelchair can safely be used as a rocking chair.

As an alternative embodiment, a single frame support assembly might be provided on the protected hoop 36 so as to define a triangular area within which the center of gravity must lie.

As depicted in FIG. 3, each drive wheel 80 of a frame support assembly contacts its corresponding hoop 34, 36 at approximately the same vertical elevation above the supporting surface 44. Thus, with all drive wheels having the same diameter, their respective support shafts lie in a common plane parallel to, but spaced above, the supporting surface. Such an arrangement simplifies arrangement of the mechanical drive mechanism.

Moreover, the elements of each frame supporting assembly 64, 72, 74, 76 can be interchangeable when the hoops 34, 36 are contacted at the same vertical elevation leading to economy in production costs. As this arrangement is preferred, it will suffice to describe in detail one of the frame support assemblies 64, it being understood that the others are identical.

The frame support assembly 64 includes a drive wheel 80 mounted for rotation with a horizontal shaft protruding from the frame 38. Each drive wheel 80 (see FIG. 5) has a peripheral surface 82 which is generally cylindrical. The cylindrical surface 82 includes a hoop receiving groove 84 that contacts the corresponding hoop 34 with sufficient frictional contact to drive the hoop 34. The outer portion 84a of the groove 84 (i.e., toward the outside of the hoop) may be designed to contact the hoop surface from the top edge of the hoop 34 to a point on the surface spaced 90° from the top edge and tangent to a vertical line so that the area on which friction acts is maximized. The inner portion 84b of the groove 84 (i.e., inside the hoop) must be at least partially relieved from contact with the hoop: this relief allows the drive wheel 80 to rotate along the non-coplanar curvature of the hoop without binding or scuffing.

To minimize lateral disengagement of the drive wheel 80 from the corresponding hoop 34, flanges 83a, 83b extend radially past the top edge of the hoop. Preferably, the cylindrical surface 82 will be located in alignment with a diameter of the hoop cross section at the point of contact to meet the above condition. Of course, the flanges 83a, 83b may be longer. But in this event, the flanges should not project below the bottom edge 85 of the hoop surface itself: otherwise the hoop flanges may be easily damaged due to the laterally unsupported exposure deformation forces.

As an enhancement to the frictional contact between the drive wheel 80 and its associated hoop 34, either or both the groove 84 and the hoop upper surface may be roughened. For example, shallow transverse serrations might be provided.

Figure 8:
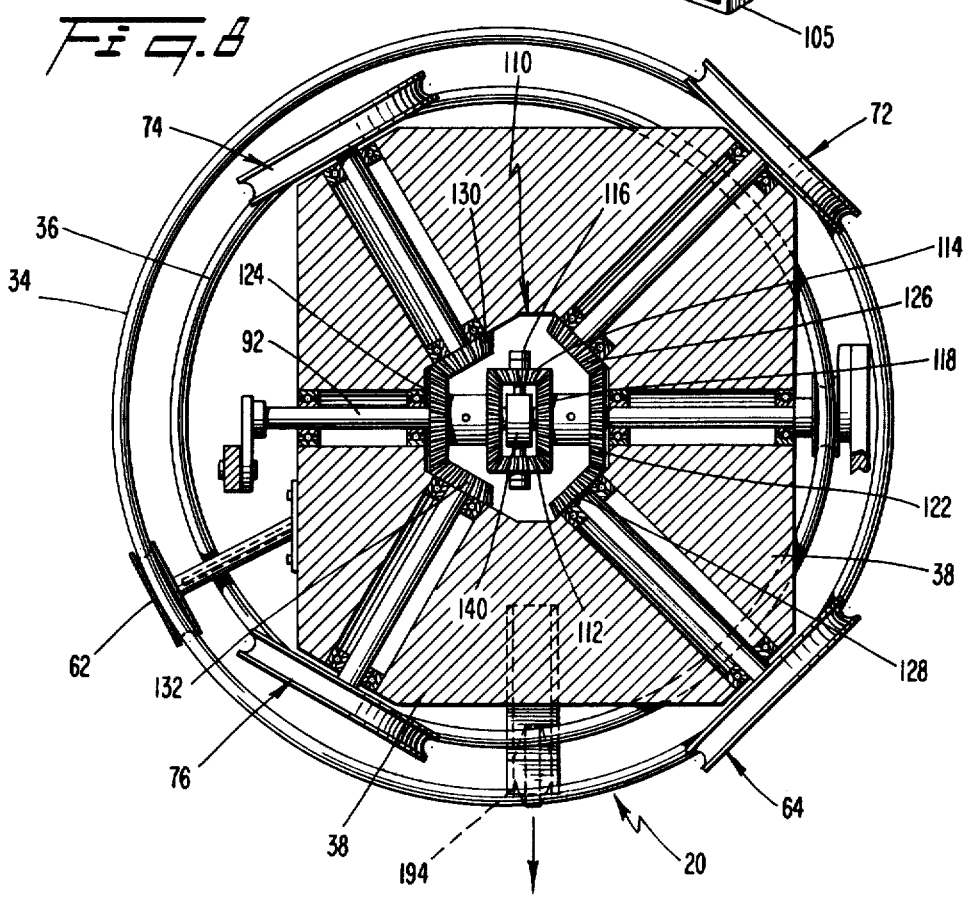
FIG. 8 is a partial cross-sectional view taken along the line 8—8 of FIG. 6.

As seen in FIG. 8, each drive wheel of the frame support assemblies 64, 72, 74, 76 is carried on a corresponding shaft extending through a side of the frame assembly 38. The angular relationship between the shafts is determined so that all shafts can lie in a common plane, all drive wheels can be of the same diameter, all drive wheels contact their respective hoops so that the drive wheel centers are all at the same elevation above the supporting surface, and the lateral and longitudinal dimensions of the quadrilateral support area are maximized.

LOCOMOTION ASSEMBLY

To self-propel the rolling suspension system 20 and the wheelchair, an improved manually operable drive system is provided in accordance with this invention. The propulsion or drive assembly 28 (see FIG. 8) includes a pair of drive cranks 90, 90' mounted 180° out of phase on opposite ends of a crankshaft 92. Each crank 90, 90' has an eccentric crank pin 94 located on a fixed pivot diameter. One end of a corresponding lever arm 30, 32 is attached to each crank pin 94. The second end 98 of each lever arm is adapted to be manually engaged by the corresponding hand of the wheelchair occupant in order to drive the corresponding crank 90. Between the ends of the lever arm 30, a fixed pivot 100 is connected to the lever arm. Each pivot 100 is attached to a corresponding link 102, 102' which has a T-shaped end.

Turning now to FIG. 7, the crankshaft 92 extends transversely of the rolling suspension assembly 20, the driving cranks 90, 90' being at each end thereof. The crank pin 94 carried by the crank 90 is 180° out of phase with the crank pin 94' carried by the driving crank 90'. The pivot links 102, 102' each provides a fixed position for the corresponding pivot 100, 100' on the corresponding lever arm 30, 32. In this manner, the driving relationship between the lever arms 30, 32 is mechanically and rigidly fixed for all phases of operation.

Each T-shaped end of the links 102, 102' is rotatably connected to a lateral bar 103. Moreover, each T-shaped end is received in a corresponding cross-slotted block 105, 105' attached to the frame. One slot of each block 105, 105' is aligned with the lateral bar 103 and is open vertically upward. This arrangement allows the bar 103 to be lifted out during lever arm collapse. In addition, each block 105, 105' has a second slot aligned with the associated link 102, 102'. This second slot is also open vertically upward and accommodates rocking movement of the link 102, 102' during operation of the lever arms 30, 32.

It is possible to obtain an infinitely variable adjustment in the mechanical advantage applied to the drive cranks 90, 90' by the lever arms 30, 32 by moving the location of the pivot 100 between the pivot arm 102 and the levers 30, 32. This adjustment may be effected by mounting the pivots 100, 100' on corresponding rotatable threaded shafts (schematically shown in FIG. 7) carried by the arms 30, 32 and mounted longitudinally thereon. Each rotational movement of handwheels on the threaded shafts then allow adjustments of the pivots 100, 100' relative to the crankshaft 92 for balanced changes in mechanical advantages.

Adjustment of the pivot points 100, 100' longitudinally of the lever arm 30, 32 (see FIG. 6) changes the mechanical advantage applied to the drive cranks 90, 92' and provides a continuum of operating positions. Simultaneously, the path traversed by the hand-operated end 98 of each crank arm 30, 32 traverses a different path. With the pivot 100 located as illustrated in FIG. 6, the handles 98 traverse a closed looping path 104 which may be described as a cambered ellipse.

As used herein, cambered ellipse is intended to refer to a closed path described by the free end of an arm, the other end of which is eccentrically mounted for rotation about an axis, the arm being pivoted about a point between its ends. Thus, the path 104 is such a cambered ellipse where the pivot is fixed on the arm and the pivot itself moves in an arcuate path.

Studies of the strengths and weaknesses of the human body have shown that the arm is approximately three times stronger in pushing/pulling movements than it is in raising/lowering movements. To accommodate these facts, the cambered elliptical path is designed to be approximately three times longer than it is high. In effect, this relationship maximizes relative anatomical strengths and weaknesses of the occupant's arms. In the apparatus itself, the location of the pivot points 100, 100' on the lever arms 30, 32 effectively proportions the cambered elliptical path to any occupant's needs.

If the pivot point 100 is moved toward the handle 98 (see FIG. 6), the mechanical advantage applied to the driving crank 90 is reduced and the handles traverse a shorter path 104'. With this shorter path, a higher speed of crankshaft rotation is possible by the operator; and, lower torque is available to the hoops. Conversely, if the pivot 100 is moved more closely to the pivot point 94 on the driving crank 90, the handles 98 will describe a longer path 104" providing greater torque and greater power to move the rolling suspension assembly, but, at a lower speed.

DIFFERENTIAL GEARING ASSEMBLY

To enhance wheelchair maneuverability, to provide a two-wheel traction drive, and to allow self-propulsion by a disabled person having the use of only one arm, the rolloing suspension system 20 is provided with a differential gearing assembly 110 (see FIG. 8). The differential gearing assembly includes a pair of planetary bevel gears 112, 114 carried by a planetary gear cage 116 which is selectably connectable with the crankshaft 92 driven by the crank arms 96. In this manner, rotary power from the crankshaft 92 can be input directly to the planetary gear cage 116 so as to rotate a pair of meshed bevel gears 118, 120 of the assembly 110. The bevel gears 118, 120 are each in meshed engagement with both planetary gears 112, 114 and are driven as output gears in counter-rotating directions as the planetary cage 116 rotates. Each of the bevel differential gears 118, 120 connects with and drives a corresponding conical friction roller drive system 122, 124.

Each friction drive system includes a driving roller disposed between a pair of driven rollers. Driven rollers 126, 128 straddle the driving roller of system 122; whereas, driven rollers 130, 132 straddle the drive roller of system 124. The driven members 126, 128, 130, 132 are each attached to a corresponding shaft which directly drives a drive wheel 80 of the corresponding frame support assembly 72, 64, 74, 76, respectively.

Suitable conventional bearing mounts may be provided on the frame 38 for the splayed drive assembly shafts and the crankshaft 92 to permit shaft rotation while maintaining the necessary engagement between driving and driven elements.

In order to adjust peripheral speeds of the hoops so as to negotiate curves, a braking means may be provided to selectively engage one or the other of the output differential gears 118, 120. This brake might, for example, comprise a yoke-mounted friction member 140 carried at the center of the differential 110. Thus, by engaging the friction brake 140 with one of the differential gears 118, 120, the engaged gear is comparatively slowed and the input power is proportionately distributed to the other differential gear by the planetary cage 116. The amount of braking force applied will control the radius of the turn and preferably could be sufficient to stop one differential gear 118, 120 entirely so that the suspension system can turn around one of the hoops.

Control means for the friction brake 140 can be advantageously placed at the handle 98 of the lever arm 30 used by the occupant's dominant arm. This placement makes the control means accessable as well as easily manipulatable by the occupant. The control means may, for example, tilt to the occupant's left to negotiate a left hand curve and to the occupant's right to negotiate a right hand curve. The degree of braking in the differential gearing assembly is regulated by the degree of tilt of the handle 98. When it is desired to brake both hoops simultaneously, the control means can be flexed rearwardly relative to its lever arm 30 so that both output gears of the differential assembly are simultaneously retarded.

In order to permit rotation of both hoops in the same direction so as to effect rotation of the wheel chair about a vertical axis, the crankshaft 92 may also be selectively engaged directly with one of the differential gears 118, 120. In this operating mode, the crankshaft 92 and the planetary gear cage 116 are disconnected and the cage 116 is restrained from movement.

Since the crankshaft 92 provides the rotational drive to the differential gearing assembly 110 in both the co-rotating hoop mode and the counter-rotating hoop mode, rotation of the shaft is all that is required to propel the rolling suspension system 20. Accordingly, the rotation of the crankshaft can be caused by one or both of the lever arms 30, 32 and still provide the desired maneuverability. Moreover, a motor may be connected in driving relation to the shaft 92 for those disabled persons who have no strength in either arm.

To brake movement of the rolling suspension system, the lever arms 30, 32 may be stopped. Alternatively, a braking device can be applied to the crankshaft 92.

To obtain passive exercise during wheelchair movement by a motor, the occupant need only grasp the lever arm handles. Alternatively, the occupant's hands might be tied to the lever arm handles.

While the input drive to the splayed shafts for the frame support assemblies has been described above as conical friction rollers, the drive could, of course, consist of a meshed beveled gear arrangement or any similar angle drive system.

THE SEAT ASSEMBLY

The seat assembly 22 (see FIG. 6) includes a back portion 140 which is pivotally connected to a seat portion 142 that, in turn, is pivotally connected to a leg support portion 144. To accommodate adult individuals of different physical proportions, both the seat portion 142 and the leg support portion 144 are adjustable, lengthwise. Accordingly, the chair can be adjusted to a wide variety of body proportions without redesigning the seat assembly.

Moreover, the pivotal connections between adjacent portions of the seat assembly 22 extend transversely thereof in a direction generally parallel to the axis of flexion for knee and hip joints in the human anatomy. Accordingly, relative movement between the seat back 140, the sear 142 itself, and the leg support 144 occurs in a natural fashion so as to provide a maximum amount of comfort to the disabled occupant. In addition, this movement also enables the occupant to shift body weight to different parts of his body to promote blood circulation, avoid fatigue, etc.

To support the seat assembly 22 relative to the rolling support assembly 20, there are a pair of four-bar parallelogram mechanisms 146, one on each side. Each parallelogram linkage 146 is a mirror image of the other, thus a description of one will suffice.

Each linkage 146 may include the seat bottom 142, the leg support 144, an extension 148 of the seat back, and a parallel connecting link 150 extending between the back extension 148 and the leg support 144 in a direction parallel to the seat bottom 142. These elements of the linkage 146 are, of course, pivotally connected in a parallelogram form. As a result, articulation between the seat back 146 and the seat bottom 142 is accompanied by articulation between the seat bottom 142 and the leg support 144, and vice versa.

Turning now to FIG. 9, the range of articulated positions is illustrated. For example, the normal position 152 can be adjusted forwardly to a vertically upright position 152a suitable for use at a table or desk. When it is adjacent forwardly with the caster wheel retracted the wheelchair also moves forward and the unit rocks forward leaving the patient's feet on the foot rest resting on the floor and the wheel hoops locked to the floor against rotation. Or, it can be adjusted rearwardly to a partially reclined position 152b suitable for reading or watching television. The seat 22 can also assume a fully reclined position 152c useful in sleeping, resting, etc. When assuming the vertically upright position 152a, the caster assembly 194 (see FIG. 3) will be placed in its non-ground contacting position to permit forward rotation of the chair relative to the hoops 34, 36.

So that the combined center of gravity 156 for the occupant and the wheelchair itself does not undergo significant excursions forwardly or reaarwardly of a vertical plane through the hoop centers and the crankshaft axis, the pivot between the seat bottom 142 and the seat back 140 is spatially fixed. The pivot is supported by a collapsible link 158 which is pivotally connected at a forward end of the frame and to the joint between the seat 142 and the back 140. To elevate the collapsible link 158, a prop link 160 extends from the rear portion of the frame 38 into supporting relation with the link 158. The prop link may engage a serrated surface to provide a range of vertica seat height positions. This arrangement of the links 158, 160 is primarily useful in collapsing the wheelchair for storage or automotive transportation.

The second point support for the linkage 146 is also the attitude adjustment mechanism 162. This mechanism may be located at the forward end of the frame 38 and includes an operating handwheel 164 which operates a vertica screw assembly to adjust the vertical spacing between the link 150 and the frame 38. The link 150 may frictionally engage this screw assembly so as to be movable therearound. To allow seat attitude to undergo adjustment during seat articulation, the link 150 may be cam shaped. Moreover, preferred positions for the seat articulation can be arranged in that same surface by suitably located detents.

If desired, the seat back 150 may also include an adjustable head rest 166. This head rest may be articulated in a suitable conventional manner either simultaneously with seat articulation or independently thereof.

In addition, the seat back 140 will ordinarily be provided with attendant handles 168, one positioned on each side of the back 140.

Also, the seat back 140 may include arm rests 170 which are mounted so as to provide a comfortable support for the occupant. Moreover, each arm rest 170 may include a pivotally attached extension 172 which is movable between a stowed position when the lever arms are being used and an extended position when the lever arms are not being manipulated for propulsion or exercise.

OPERATION

As an aid to understanding the selfrighting characteristics of the wheelchair of the present invention, FIG. 11 illustrates the relationship between the effective radius $R_a$ of a hoop 175 inclined at an angle $\theta$ relative to a supporting surface. For purposes of illustration, the hoop 175 is considered to have a diameter equal to 2R, R being the hoop radius. As graphically illustrated, the effective radius for the hoop lying on its side is substantially greater than the actual radius of the hoop.

In side elevation, as seen in FIG. 6, each of the generally circular hoops presents an elliptical projection. The minor axis of this elliptical projection can be shown by elementary trigonometric considerations to be equal to $R \times \sin \theta$. As noted earlier, it can be rigorously shown that the radius of curvature at the minor axis of such an ellipse is $R/\sin \theta$. Accordingly, the shallower the inclination of the hoop with respect to the horizontal, the greater the apparent effective radius. In FIG. 6, the point 180 corresponds to the apparent center of curvature of the prominent hoop 34. There is also an effective radius for the smaller hoop. It is the design intention to make the average effective radius of the two hoops equal to the average eye height of an adult seated occupant. It will be seen in addition, that this point 180, the average effective radius, is in general horizontal alignment with the location of the eye 182 of a seated occupant. With this orientation, sickness including motions are not perceived by the eye or sensory organs in the wheelchair occupant's head. Accordingly, there is no tendency for the wheelchair occupant to become nauseous during movement of either the chair or the occupant which might tilt the occupant.

In addition, the center of gravity 156 for the occupant and the chair is substantially below the elevation of the point 180 and in vertical alignment therewith. With the center of gravity 156 disposed below the apparent center of curvature 180, a perturbation of the wheelchair from vertical is accompanied by an opposing force moment generated by the center of gravity which tends to right the chair. And, when placed on an inclined supporting surface, the wheelchair will rock to a position where the center of gravity 156 is in direct vertical alignment with the apparent center of curvature 180. Accordingly, the chair is free to rock in the sense of a rocking chair about a central position (see FIG. 11) and will also stabilize itself on an inclined plane, but in a position somewhat different than if it were on a horizontal flat surface.

In order to propel the chair along a plane surface in a straight direction, the wheelchair occupant engages the handles 98 of the lever arms 30, 32 and applies force generally tangential to the handle trajectory which moves them along the cambered elliptical path 104. In so doing, clockwise movement of the handles around the cambered elliptical path 104 corresponds to forward movement of the wheelchair because there is a direction reversal between the crank shaft and drive rollers. Conversely, counterclockwise movement of the handles 98 through the path 104 corresponds to rearward movement of the wheelchair.

In either event, the movement of the crank handles causes the lever arms 30, 32 to rotate the corresponding cranks 90, 90' and the associated crankshaft 92.

Turning now to FIG. 8, rotary movement of the crankshaft 92 is transferred to the planetary gear cage 116 causing equal rotations in the output differential gears 118, 120. Rotation of the gear 118 causes the wheels 80 of the frame support assemblies 64, 72 to operate in one rotational sense; likewise rotation of the differential gear 120 causes the frame support assemblies 74, 76 to rotate in the opposite directional sense. Accordingly, the hoops 34, 36 rotate at equal peripheral speeds but in opposite directions. In so doing, the support assemblies 64, 72 (see FIG. 6) continually move forwardly on the prominent hoop 34 while the other frame support assemblies 74, 76 advance on the protected hoop 36. Thus, movement of the hoops 34, 36 corresponds generally to that of the continuous track on a tracked vehicle.

When it is desired to negotiate a curve, the control means handle 98 is tilted in the desired direction to retard one differential gear 118, 120 path with the braking assembly 140. Accordingly, the movement of the planetary gear system 116 transfers additional power to the opposite differential gear causing the hoop on the outside of the curved path to rotate at a slightly higher peripheral speed. In this manner, even with continued operation of the lever arms 30, 32 at the same speed, the wheelchair negotiates a smooth curve at the same average velocity as when it was moving straight ahead. In the vent that it is desired to turn sharply about one side of the chair, the corresponding differential gear 118, 120 is entirely stopped by the braking member 140 so that the chair can rotate around the stopped hoop.

Should it be desired to rotate the chair about a vertical axis, for example during a closequartere maneuver in a closet or a similar confined area, the planetary gearing 116 (see FIG. 8) is disconnected from crankshaft 92 and stopped while the crankshaft 92 is drivingy interconnected with one of the differential gears 118, 120. In this mode, the hoops 34, 36 are driven in the same rotational direction (see FIG. 8) when viewed from above so that the wheelchair rotates around a vertical axis.

In order to climb a vertical obstacle between two horizontal surfaces such as a curb, the wheelchair is positioned with the prominent hoop 34 overlying, the vertical obstruction and the protected hoop positioned adjacent to the obstruction on the lower of the two horizontal surfaces. For this reason, the idling wheel 62 supporting the prominent hoop is positioned generaly forwardly of the transverse centerline of the rolling support assembly. In order to effect this placement of the prominent hoop 34 relative to the vertical obstruction, and to be able to maintain a comfortable and safe seated posture with the seat articulation, it will ordinarily be desirable to move the rolling support rearwardly against the obstruction.

At this point, the prominent hoop 34 presents what appears to be a very gradual incline up the vertica obstruction (see for examle FIG. 1b). By rotating the chair 180°, or less depending on the height of the obstacle, the ground contact position of the prominent hoop moves to the upper vertical surface and the contact position for the protected vertical hoop is positioned remote from the vertical obstacle. The wheelchair is then advances toward the obstacle so that the protected hoop rolls over the obstacle to place the protected hoop contact position on the upper horizontal surface. Accordingly, it will be apparent that the wheelchair provided in accordance with the present invention is capable of climing a vertical obstacle without requiring the assistance of an attendant.

The rolling geometry of this wheelchair has another inherent characteristic which is particularly, desirable for diabled individuals: an inherent braking against inadvertent movement backward, as might occur when the occupant reclines when going up an inclined surface. In this connection reference is again made to FIG. 6. In the presence of an inclined surface, the center of gravity 156 is positioned rearward of the location illustrated in FIG. 6. Accordingly, because of the rolling geometry between the frame support system and the hoops, the seat portion 22 of the chair will assume a slightly reclined position in order to align the center of gravity 156 with the apparent radius of curvature 180. As this occurs, the ground contact tangents (see FIG. 12) for the hoops 34, 36 move from the positions 190, 190' where they are parallel to the positions 192, 192', respectively which are mutually antangonistic via friction to rolling. When descending an incline, a natural braking may be obtained by partialy reclining the seat to move the center of gravity back of the balance point which makes the points of contact between the hoops and ground diverge. Controlled descent may be achieved by regulating the seat reclining action.

It will be seen that the tangents 192, 192' are convergent to one another. This convergence provides an inherent braking force which prevents the chair from rolling or sliding down the incline. The rolling geometry has a similar characteristic when the center of gravity 184 moves to the position 184" corresponding to a forward incline, which for forward motion becomes increasingly self rocking and dangerous. To compensate for this characteristic, the caster wheel assembly 194 (see FIG. 6) is provided at the forward end of the frame 38. During rolling of the wheelchair, the caster wheel is positioned as illustrated in FIG. 6 so as to engage the supporting surface and prevent the wheelchair center of gravity from moving forward of the position illustrated in FIG. 6. On the other hand, when it is desired to use the chair as a rocking chair, or to sit bolt upright at a desk or table, the caster wheel assembly 196 can be rotated about a horizontal axis to the stowed position where it will not interfere with rocking excursions or intentional forward tilting of the chair and center of gravity. The forward tilting with caster retracted is stable against forward or rearward rolling without formal braking. In the stowed configuration, the wheelchair occupant can thus rock in the same fashion that a nondisabled person does in a rocking chair and the inherent braking will keep the rocking chair from migrating even if the formal brake is not engaged.

To collapse the wheelchair for transportation or storage, the connecting rod 103 (see FIG. 7) is lifted from the pivot blocks 105, 105'. This movement allows the lever arms 30, 32 to pivot forwardly about the associated crank 90, 90' to a collapsed position. This collapsed position for the lever arms 30, 32 is also preferred when the wheelchair is to be used at a desk or table.

Further collapse of the chair requires folding of the seat assembly 22 (see FIG. 13). The seat bottom 142 is foled upwardly toward the seat back 140 until the bottom and back are closely adjacent. Simultaneously, the parallelogram linkages fold themselves and the leg support 144 against the seat bottom 140 (see FIG. 14). The head rest 166 then folds over the seat bottom 140 to retain the collapsed configuration for the seat. To collapse the seat 22 on the rolling suspension system 20, the support link 160 is disengaged from its supporting relation to the collapsible link 158. Thus, the seat assembly is allowed to fold down onto the rolling suspension system 20 in a longitudinally centered relationship to the rolling suspension system to the configuration shown in FIG. 15.

The wheelchair of this invention also makes possible a patient-oriented post-surgery recovery use. For example, the post-operative patient could be placed on a fully reclined wheelchair and returned to his room. As recovery progresses, the patient's movements would cause some rocking movement of the wheelchair. Such movements would jostle his internal organs in a therapeutic manner to discourage adhesion formation. Moreover, as recovery progressed, the patient would be able to move himself to actively discourage adhesion formation and to more comfortable positions as well as to move about the room itself.

GENERALIZATION

The description of the rolling suspension assembly for a wheelchair presented above will now be generalized so that its extension to a myriad of possible uses and potential variations can be more readily visualized.

Initially, the concept of stability for a system of forces in equilibrium must be considered. In such context, a familiar example which clearly demonstrate stability concepts is a right circular cone. If the cone is balanced on its apex, any force perturbation disturbing the equilibrium will cause the cone to fall: such a condition is called unstable. If the cone is resting on its conical surface, a disturbing force parallel to the surface will cause the cone to roll and shift its position to a new state of equilibrium: such a condition is called neutral stability. A vertical disturbing force would tend to lift the cone which, upon withdrawal of the disturbing force, would return to its initial position: this is a stable condition in which self-righting occurs. The most appropriate example of a stable self-righting condition occurs, however, for a cone resting on its base. Here, vertical or horizontal disturbing forces will tend to lift the cone and, upon removal of the force, the cone will right itself.

The discussion above serves as a basis for further generalization of the stability concept. The stability characteristic is dependent on the effect of a perturbing force on the system center of gravity. More particularly, the potential energy of the center of gravity for a structure in force equilibrium is a relative minimum in a stable self-righting position. Conversely, the potential energy of the center of gravity for a structure is a relative maximum in an unstable position. Neutral stability corresponds to a constant potential energy for the structure.

These conditions of stability can be analytically evaluated for a generalized system by expressing the potential energy of a structure as a mathematical function in terms of two spatial coordinates defining the possible ranges of motion. When the first and second derivatives of this function satisfy classical conditions for a relative minimum at a point, then the condition for stability is met at that point. Moreover, the magnitude of the second derivatives relates to the strength of the stable position with respect to self-righting when perturbing forces are removed.

Now, considering the support for the wheelchair as discussed above (see FIG. 6), a perturbing force on the prominant hoop 34 tending to rotate the hoop about a horizontal axis in its plane raises the center of gravity 156: thus the assembly is self-righting with respect to this force. If the perturbing force acts so as to rotate the hoop about a vertical inclined axis in the plane of the hoop, the center of gravity 156 would be raised again: hence there is a self-righting stability as to that force. If a perturbing force acts to rotate the system about a horizontal axis extending laterally of the assembly, it can rigorously be demonstrated that the result is to raise the center of gravity: again, self-righting stability is displayed. But, if a perturbing force induces rotation of the hoop in its plane, about its axis of symmetry, then there is no net deviation in potential energy of the system: thus, neutral stability. Rolling of the canted hoop on a perfectly flat horizontal surface is a case of neutral stability: the geometry has no preferred orientation.

Since the concept of self-righting stability for a rolling suspension system having support members which behave like ellipses in response to perturbations about a horizontal axis is a fundamental concept for purposes of this invention, a brief discussion is now in order. For any curved surface defined by $y = f(x)$ where the center of gravity is located at coordinates $(x_1, y_1)$ the elevation Z of the center of gravity as the surface rotates is given by the following expression $$Z = \frac{(x - x_1) dy/dx + y_1 - f(x)}{\sqrt{1 + (dy/dx)^2}}$$

where $dy/dx$ is the first derivative of $f(x)$. For the lower half of an ellipse, this expression reduces to $$Z = \frac{y_1 \sqrt{a^2(a^2 - x^2)} + a^2 b - b x\, x_1}{\sqrt{a^2(a^2 - x^2) + b^2 x^2}}$$

where a is the semi-major axis, b is the semi-minor axis, and $(x_1, Y_1)$ are the coordinates of the center of gravity relative to the center of the ellipse. For excursions of x about the point $x = 0$, the height of the center of gravity increases relative to a minimum value at $x = 0$ and, therefore, the system has a stable geometry. And, this stability prevails even where the rolling suspension system contacts the supporting surface only at two spaced points as in the case of the wheelchair.

For the wheelchair discussion above, the semi-major axis a corresponds to the hoop radius R whereas the semi-minor axis b corresponds to $R \sin \alpha$, where $\alpha$ is the angle of hoop inclination.

In the general form of the invention, the stability condition is effected using circular support members inclined relative to the support plane. As illustrations, several possible examples will now be discussed.

SHAFT-DISC EXAMPLES

Rolling support members 200, 202 (see FIG. 16) are each inclined by an angle $\alpha$ relative to an underlying surface 204. Each rolling support 200, 202 engages the surface 204 at a corresponding contact zone 206, 208. These contact zones 206, 208, in theory, may be merely points; however, in reality, the point contact is represented by a small area of contact where the contacting materials have deformed elastically to bear the imposed loads.

Each of the support members 200, 202 illustrated in FIG. 16 is identical. Accordingly, it will suffice to discuss one of the members, it being understood that the other element has the same features. Each support member 200 is generally circular, is symmetric to an axis of symmetry 212 and is provided with a circular aperture 210 which is concentric to the axis of symmetry 212. This combination provides centering of the washerlike disks to the shaft axis and induces a preferred orientation axially. This property is useful but may not be necessary if axial stability is not desired for some particular application.

The aperture 210 has a diameter sufficiently great to enable the support member 200 to move axially over a shaft 214 during assembly. Adjacent to the central aperture 210 and contiguous with the edge of the aperture, each surface of the support member 200 is provided with a frustoconical surface 216, 218, respectively. The first frustoconical surface 216 has pure rolling contact with a corresponding conformingly shaped frustoconical surface 220 of the shaft 214. Similarly, the second frustoconical surface 218 is in rolling contact with a second frustoconical surface 222 provided on the shaft 214. Both conical surfaces have a common apex at the intersection of the shaft centerline and disc centerline.

These frustoconical surfaces and the mating support member surfaces are effective to axially position the support member. Moreover, the effect is to act like a thrust bearing rather than a radial bearing. Accordingly, lower values of rolling resistance attributable to friction result and simultaneously the vertical load bearing ability of the system is enhanced.

The frustoconical surfaces 220, 222 of the shaft are axially spaced from one another and have coaxial alignment. In addition, the apices of the frustoconical surfaces 216, 218, 220, 222 preferably coincide at a point 224 on the shaft axis 226. For each pair of mating surfaces 216, 220 and 218, 222, there is a relationship between the cone angles which must be satisfied: the cone angle $\theta$ of the shaft surface (220, 222) must be no greater than $\alpha$, the angle of inclination; and the cone angle $\phi$ for the corresponding support member surface (216, 218) must be equal to $90° + \theta - \alpha$. As mentioned above, the apices of mating frustoconical surfaces must be coincident. It will also be apparent that the cone angles $\theta$, $\phi$ for the mating surfaces need not be identical for the two surface pairs 216, 220 and 218, 222 in order to achieve true rolling.

The portion 228 of the shaft 214 between the frustoconical surfaces 220, 222 of the shaft may be contoured but must have a length which is consistant with rolling contact between the mating surfaces as desired. As illustrated in FIG. 16 the shaft portion 228 may be cylindrical. Alternatively, any configuration is acceptable provided it does not create a sliding or frictional engagement with the rotable support member 200 and that it permits assembly.

The shaft 214 serves as a means for supporting and interconnecting each support member 200, 202. Moreover, the shaft with its mating surfaces maintains the inclined relationship of the support members relative to the underlying support surface.

As seen in the end elevation of FIG. 17, rotational movement of the supporting member 202 in the direction of arrow 230 causes a corresponding rotation of the shaft 214. Moreover, the rolling contact which occurs between the support member 202 and the shaft 214 is similar to that of a large diameter roller coacting with a concave elliptical surface. This enwrapping configuration when combined with conjugate conical surfaces in contact is conducive to carrying large loads in a virtually frictionless manner.

Generally speaking, the axial spacing between the two rolling supports 200, 202 (see FIG. 16) is selected to provide sufficient spacing between the contact zones 206, 208 to provide self-righting stability to system rotations in a plane containing the shaft axis 226 which plane is perpendicular to the underlying surface 204. As desired, each contact zone 206, 208 may be located closer to the shaft central portion 225 than the supporting frustoconical surfaces 220, 222 or vice versa. The alternates correspond to different orientations of the rolling support members 200, 202 with the shaft 214: (a) convergent upwardly as illustrated, (b) convergent downwardly, (c) parallel extending upwardly to the right, and (d) parallel extending upwardly to the left.

Each rolling support member 200, 202 in the conical form shown in FIG. 16 is also inherently stable in the system. More particularly, rotation of the member 200 about its axis of symmetry produces neutral stability as there is no force component to raise the system center of gravity 223. Moreover, rotation of the member 200 about a horizontal axis passing through the point 224 perpendicularly to the shaft axis 226 effects an elevation of the center of gravity 223 and, therefore, has self-righting stability. In addition, rotation of the member 200 about a vertical axis 227 in the plane of the member 200 also elevates the system center of gravity and, therefore, has self-righting stability. And finally, rotations of the system about the horizontal axis 226 effect an elevation of the system center of gravity as discussed above and hence have self-righting stability. The rotations here discussed in connection with stability would, for example, be induced by perturbing forces.

To this point a "conical form" has been considered, that is, a form using frustoconical support surfaces on the interconnecting shaft. However, the geometry can also be extended to a cylindrical shaft using annular members with frustoconical mating surfaces.

Turning now to FIG. 18, another example of the shaft-disc conical rolling geometry arrangement is illustrated in which the rolling support members 202, 200 of FIG. 16 are modified to provide for two generally annular ring-like or hoop-like ground engaging support members. More particularly, in FIG. 18, the radial widths of each of the rings 234, 236 is small in comparison with the outside diameter of each ring.

The means for interconnecting and axially spacing the rings 234, 236 is also a shaft 238 having frustoconical surfaces 240, 242 which support the first ring 234 and a second pair of frustoconical surfaces 244, 246 which support the second ring 236. Each ring 234, 236 is also provided with a corresponding pair of conical surfaces 248, 250 and 252, 254 respectively. Moreover, all frustoconical surfaces have a common apex 256 which is positioned along the center line 258 of the shaft 238 at the intersection of the axes 260, 262 about which the rings 234, 236 are free to rotate. In addition, the interrelationship of the frustoconical surfaces is the same as discussed above in connection with FIG. 16.

It will be observed that the frustoconical surfaces 248, 250, 252, 254 (FIG. 18) subtend essentially the entire radial width of the ring 234. If desired, the radial width of the rings 234, 236 may be greater or less than the axial length of the corresponding conical surfaces 240, 242, 244, 246 of the shaft 238. For stability purposes, and for low friction properties in the bearing portion of this nesting geometry, it is merely a necessity that there be pure rolling contact between conical surfaces of the rings 234, 236 and conical surfaces of the shaft 238.

The ring embodiment permits the two rings 234, 236 to be nested relative to one another such that the contact zones are substantially coextensive with the lateral width of the assembly provided that the inside diameter of the outer ring 236 will accomodate the outside diameter of the inner ring 234 in this nested orientation.

A load 264 may be supported on the upper peripheral edges of the rings 234, 236 so that movement of the rolling support assembly is effective to permit movement of the load 264 with very little frictional resistance. Lateral stability of the support assembly in the vertical plane containing the shaft axis 258 is provided by the spaced contact zones between the rings 234, 236 and underlying support surface 204. Stability of the system for perturbations of the ring is the same as discussed for FIG. 16.

In another embodiment, each rolling support may comprise a cup-like assembly 266, 268 (see FIG. 19) which opens vertically upwardly, contains a complement of single balls constrained to roll against hardened steel spheres, and is mounted for rotation about a corresponding inclined generally vertical axis 270, 272. Details of each cup-shaped assembly 266, 268 are identical and it will therefore suffice to describe only one in detail, it being understood that the details of the other cup assembly are essentially identical.

Each cup assembly 266 through its complement of small balls rolling on the hardened sphere supports a vertical load applying assembly 274 at a position along its axis of rotation 270 which is also the axis of symmetry for its bearing surfaces. In this manner, the frictional resistance to rotation of the cut assembly 266 is minimized. In addition, each cup assembly 266 is provided with an internal frustoconical surface 276 and an external frustoconical surface 278. These frustoconical surfaces 276, 278 straddle a shaft 280 which extends between the two cup-shaped assemblies 266, 268.

The shaft 280 is provided with a frustoconical surface at its end 282 having a cone angle the apex of which is located at the intersection of the rotational axis 270 and the shaft axis 284. Similarly, the apex of the conical surface 276 is positioned at the intersection of axes 270. In this manner, there is pure rolling contact between the frustoconical surfaces 276, 282. Pure rolling contact between the conical surface 278 and the cylindrical surface of the shaft 280 is provided by placing the apex of the cone defining the surface 278 at a point 286 on the axis 270 corresponding to the elevation of the upper surface of the shaft 280.

The conical surfaces 282, 282' at each end of the shaft 280 provide a means for axially positioning the cup assemblies 266, 268 with respect to the shaft 280 via a positional minima. In addition, it will be noted that the shaft 280 is not physically restrained in its longitudinal direction. This absence of longitudinal restraint has been found to have unique characteristics. When the rolling support assembly of FIG. 19 is advanced along the surface 204 (in a direction out of the plane of the figure) each of the cup assemblies 266, 268 rotates about its corresponding axis 270, 272 in counter-rotating directions. Provided that the cup assemblies 266, 268 are completely identical, the angular velocity of each cup assembly about its corresponding axis is the same as that angular velocity for the other cup assembly.

When the support assembly is caused to negotiate a gradual curve, the shaft 280 longitudinally repositions itself by moving towards the center of the gradual curve. At this time, the frustoconical surface 276 rides on a larger radius portion of the conical surface 282 whereas the frustoconical surface 276' rides on a smaller radius portion of the conical surface 282'. Accordingly, the relative angular velocities of the two cup assemblies 266, 268 are modified to accommodate the differential velocities necessary to negotiate the curved path without introducing appreciable sliding. Thus, the cup assemblies 266, 268 and their associated shaft 280 comprise a self-acting differential which can successfully negotiate either a curved trajectory or a straight rectilinear path.

An analysis of self-righting stability for this embodiment gives the same results as discussed above for FIG. 16.

A nested canted hoop rolling geometry assembly having potential usefulness in mechanical systems is illustrated in the embodiment of FIG. 19a. A shaft 233 includes a first pair of frustoconical surfaces 235, 235' equally spaced from a central point 239 and an axis 241 passing through the point 239. Extending perpendicularly to the shaft axis 241 and through the point 239 is a secondary axis 243. In addition, the shaft has a second pair of frustoconical surfaces 237, 237' also equally spaced from the point 239.

A pair of short shafts 245, 245' are coaxially mounted on the secondary axis 243 so as to straddle the shaft 233. Mounted on corresponding bearings on each short shaft 245, 245' are a pair of frustoconical discs 247, 247' and 249, 249'. The discs 247, 247' have a frustoconical surface 251, 251' while the discs 249, also have a frustoconical surface 253, 253'.

In addition, a pair of nested rings 255, 257 are arranged around the shaft 233. The ring 255 has frustoconical surfaces in rolling contact with corresponding ones of the first pair of shaft surfaces 235, 235' and with corresponding ones of the frustoconical surfaces 253, 253' of the discs 249, 249'. Similarly, the ring 255 has frustoconical surfaces in rolling contact with corresponding ones of the second pair of shaft surfaces 237, 237' and with corresponding ones of the frustoconical surfaces 251, 251'. With the foregoing arrangement, all surfaces are self reacting.

Turning now to FIG. 20, another embodiment of the rolling suspension system is depicted which incorporates a pair of crossed-hoops 286, 288, which are supported with respect to a shaft assembly 290 so as to support the shaft assembly 290 relative to the underlying surface 204. As illustrated, one end of each hoop 286, 288 is rotatably positioned so as to engage a generally radially extending flange 292 carried at one end of the shaft 290. This flange 292 is provided with a circumferentially extending groove 294 which is configured to receive each of the hoops 286, 288.

In this connection it will be noted that the groove 294 accommodates a tire 296 connected to the hoop 288. Each hoop 286, 288 is provided with a tire 296 which is positioned between the respective hoop and the underlying surface 204 so as to increase the tractive friction therebetween, muffle and cushion the contact therebetween, and the like.

The opposite end of each hoop is likewise supported by a flange having an appropriately configured groove. Specifically, a remote portion of the first hoop 286 is supported above the underlying surface 204 by a flange 298 which has a groove 300. The groove 300 is also configured so as to accommodate the tire 296 carried by the first hoop 286. Displaced axially from the flange 298 is another flange 302 which has a groove 304 which is adapted to ride on and receive top of the second hoop 288. The flanges 298, 302 are rotatably mounted with respect to the shaft 290 and are axially spaced from one another. Disposed between these flanges 298, 302 is a friction inducing assembly rotationally fixed to the shaft 290 and 306 operable to change the relative rotation rates between the two flanges 298, 302 to permit following a curved path. The upper ends of the hoop are very lightly loaded (only ½ the hoop weight) and can easily slide to accommodate turning without appreciable energy loss or wear.

Accordingly, by driving the shaft 290 with a suitable conventional prime mover and locking the relative rotation rates between the flanges 298, 302, the rolling suspension system of FIG. 20 will track a straight path. On the other hand, if it is desired to negotiate a gradual curve, the friction inducing assembly 306 may be adjusted to permit relative slippage between the flanges 298, 302. In this manner, the rolling support assembly will be caused to negotiate a curve either to the right or the left in the direction of travel. Such an embodiment would be of particular use as a rear end in an automobile to take over the function normally provided by the differential.

A comparison of FIGS. 6 and 20 will indicate the similarity between this concept of a rolling support system and the wheelchair discussed at length above.

As before, a stability analysis gives the same conclusions as were obtained for FIG. 16.

Turning now to FIGS. 21 and 22, two further embodiments for a hoop-type structure are disclosed. In FIG. 21, the hoops 308, 310 are inclined relative to the underlying support surface 204 at an angle $\alpha$ such that contact zones 312, 314 are positioned remotely from one another by as a great a distance as may be desired. Moreover, the hoops 308, 310 are inclined toward one another. The means 316 interconnecting the hoops 316 includes a pair of support rollers 318, 320 each of which underlies and supports one end portion of the corresponding hoop 308, 310. The interconnection means 316 also includes a plurality of rollers 322 which support the interconnection means 316 relative to each of the hoops 308, 310. As discussed above in connection with the wheelchair, there may be a pair of rollers 322 positioned on each of the hoops so as to support the hoop and the interconnection means in the proper spatial relation. With the hoop supports 318, 320 being positioned between the contact zones 312, 314, lateral stability of the assembly against rotation in the plane of the contact zones 312, 314 is substantially enhanced so as to predominate.

In applications where it may be desired to have the fore and aft stability of the rolling assembly predominate, an assembly such as illustrated in FIG. 22 may be employed. The hoops 324, 326 are again inclined relative to the underlying support surface 204 and each contacts the support surface 204 at a corresponding contact zone 328, 330, respectively. The interconnection means 332 which holds the hoops in their mutually inclined relationship includes a pair of support rollers 334, 336 each of which supports corresponding end portion of the corresponding inclined hoop 324, 326. The interconnection means 332 is supported relative to the hoops 324, 326 by a plurality of rollers 338, 340 which engage the upper surface portion of each hoop. By positioning the contact zones 328, 330 between the support portions 334, 336 of the respective hoops, it will be seen that lateral stability of the assembly is substantially reduced in comparison to the assembly of FIG. 21. Accordingly, the fore and aft stability of the rolling support assembly is enhanced in the FIG. 22 embodiment relative to the FIG. 21 embodiment.

The stability analysis for the hoops in the FIG. 21 and FIG. 22 embodiments proceeds parallel to the discussion for FIG. 16 and yields the same conclusions.

MULTIPLE CONE EMBODIMENTS

The foregoing discussion has concentrated primarily on different types of annular geometries which may be utilized to provide pure rolling contact so as to substantially reduce friction in a rolling suspension system. There are, of course, other types of rotary members which can supply the same or similar inherently stable rolling systems. For example, the important feature of each the foregoing embodiments is the existance of a circular member inclined relative to the underlying support surface which member is operable to rotate in its plane with rolling contact on the support surface 204.

Turning now to FIG. 23, another embodiment of the rolling suspension system is illustrated in which a pair of cones having a cone angle, $\beta$, exceeding 45° are connected at the apices in some motion-permitting way so as to be rotatable. A flexible piece of cord is one such way. More particularly, each cone 350, 352 includes a base surface 354, 356 respectively. The peripheral edge of each base surface 354, 356 engages the underlying support surface 204 at a corresponding contact zone 358, 360. These contact zones 358, 360 are laterally spaced from one another. The peripheral edges of the cone bases 354, 358 also engage and roll upon one another at a vertically uppermost point 362 of the rolling support system.

In addition, the apices of the cones 350, 352 are held together by an interconnection means 364 such as the previously mentioned tensile cord link which interconnects the cones in their preferred geometric relationship and maintains the base surfaces 354, 356 at the proper angular inclination, $\alpha$, with respect to the horizontal plane 204. The angle $\alpha$ is preferably selected to be less than 30° where the cone angle permits so that the effective diameter of the peripheral edge of surface 354 is more than twice as great as its actual diameter. With the foregoing construction, the center of gravity 357 for this system is substantially below the effective radius and a stable structure is obtained.

Naturally, the magnitude of the cone angle, $\beta$, is interrelated with the angle of inclination $\alpha$: for the conical surface of each conical member 350, 352 to be spaced above the underlying support surface 204 so that no sliding will occur therebetween. The sum of $\alpha + \beta$ must exceed 90° if there is to be line contact between the surfaces of the cones and edge contact with the underlying support surface.

It will be observed that line contact between the surfaces of the cones 350, 352 in FIG. 23 occurs along a line extending vertically upwardly from the apices to the point 362 along which rolling contact is possible.

Turning to FIG. 24, the cones 350, 352 are seen to be essentially conical shells. If necessary, lateral reinforcements can be inserted within the cones in order to reduce their inherent resiliency. On the other hand, the inherent resiliency of a thin walled conical form of springy material may in some applications be used to substantial advantage in providing a shock absorbancy.

As a result of the conical structure, it will be seen from FIG. 23 that the speed along the surface 204 of the rolling support assembly incorporating a pair of conical members 350, 352 will be dependent upon the rate of angular rotation as well as the diameter of their respective bases 354, 356. Conical members having line contact on their surfaces will have angular velocities related by the inverse ratio of the tangent of the cone angles. The surface velocity of each cone will be the product of its base radius and its angular velocity and because of their common apex true rolling will be achieved throughout their common contact zone.

It can be seen that if conical members having a different cone angles are employed but with a common apex, the rolling action will be preserved but the assembly which is an asymetrical version of FIG. 23 will traverse a curved path by virture of the dissimilar angular velocities.

Since the conical rolling geometry differs substantially in appearance, the stability characteristics will now be considered in some depth. With respect to stability to system rotations in a vertical plane extending between the contact zones 358, 360 (i.e., about a horizontal axis projecting from the plane of the figure), it is clear that such rotation induced by perturbing forces has the effect of raising the center of gravity 357: accordingly, there is self-righting stability as to such forces. Perturbing forces causing system rotations about a horizontal axis 351 in the vertical plane of the contact zones 358, 360 also have the net effect of elevating the center of gravity 357. Since the base surfaces 354, 356 have elliptical projections in side elevation and the analysis given hereinabove pertains. Thus, there is self-righting stability about the axis 351.

Behaviour of the conical members 350, 352 will now be considered. Perturbing forces acting to cause rotation about the axis of symmetry 353 of a conical member have no net effect on elevation of the system center of gravity 357 and, therefore, there is neutral stability. Force components causing rotation of a conical member about a vertical axis 355 in the plane of the cone base 354 raise the system center of gravity due to its eccentric location vis-a-vis the base plane: thus, self-righting stability prevails. And finally, force components causing rotation of the conical member about a horizontal axis 359 in the plane of the base 354 also cause an elevation of the system center of gravity 357 due to its eccentric location: again there is self-righting stability.

Summarizing, any perturbing force component acting to cause any effect other than rotation of a conical member about its axis is countered a self-righting effect on the center of gravity. As to rotation of the conical members, there is neutral stability.

Like the disc-type rolling supports discussed above, the conical configuration is also susceptible to numerous variations. In this connection, several such variations will now be discussed briefly to exemplify the wide range of structures which can be designed and still make use of the concept of the present invention.

Turning now to FIG. 25, another matched pair of conical support members 368, 370 is illustrated each of which has a corresponding base surface 372, 374 and each of which is inclined at an angle with respect to the underlying support surface 204. The perimeter of each base surface 372, 374 contacts the perimeter of the other at a point 376 disposed vertically above the surface 204. The apices of the two conical members 368, 370 are interconnected by a suitable interconnection means 378 which spatially fixes the two cones relative to one another.

The interconnection means 376 may for example be a tensile link or shaft having a portion in each conical member which is in general alignment with the axis of symmetry for that conical member so as to use a journal bearing mount.

Figure 26:
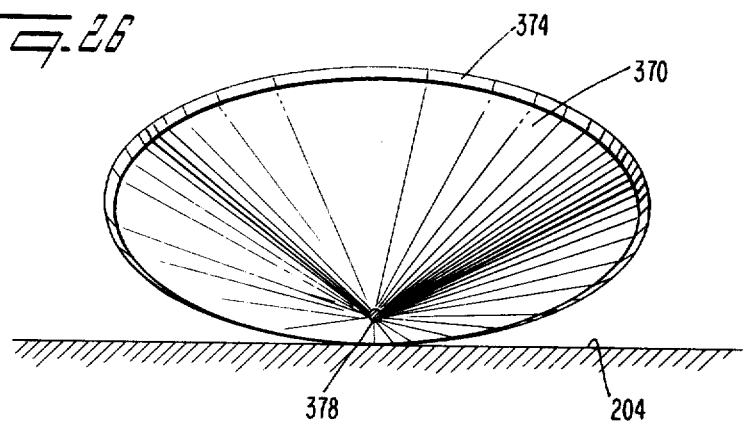
FIG. 26 is a side elevational view of the embodiment of FIG. 25.

Again, by keeping the angle alpha at 30° or less, a substantially increased effective radius for the rolling support assembly is attained. Moreover, the rolling contact occurs centrally along the peripheral edges of the conical members at the point 376. While convex surfaces rolling against convex surfaces, such as would be seen in a plan view of FIG. 25 are generally an unstable rolling configuration, the very strong self-righting tendency of the conical members with their bases inclined as described predominates so that the rolling structure is very stable. FIG. 26 exemplifies the elliptic projection resulting from a side view.

To assure that the bases 372, 374 will have peripheral contact and still roll on the surface 204, the edge of conical member 368 may have a concave groove 369 which mates with a corresponding convex rib 371 on the other conical member 370. In fact, this rib-groove arrangement maintains the vertical relationship between the two conical members 368, 370 and avoids disengagement therebetween.

In the FIG. 25 embodiment, the product of cone height with the angular velocity of the cone and with the tangent of the cone angle is a constant for both conical members 368, 370. Accordingly, even though the conical members have different cone heights and/or different cone angles, the assembly will track a straight line in the underlying support surface. As to stability, the discussion in connection FIG. 23 applies.

Figure 27:
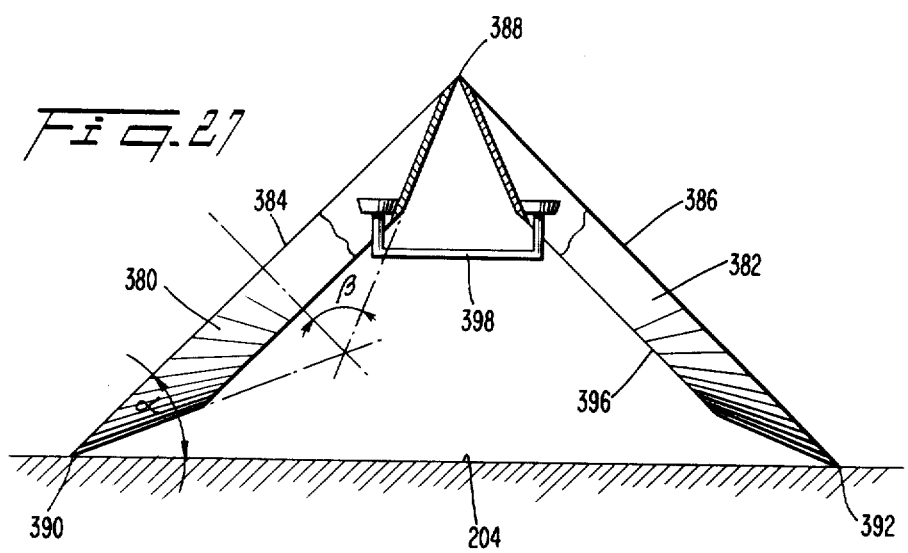
FIG. 27 is a front elevational view in partial cross section of a pair of frustoconical members having an apex angle greater than 90° and peripheral contact.
Figure 28:
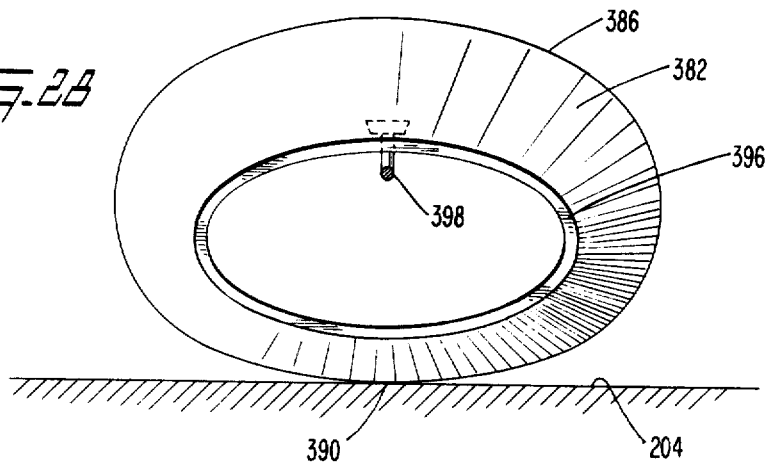
FIG. 28 is a side elevational view of the embodiment of FIG. 27.

Turning now to FIG. 27, another embodiment is disclosed in which the cone angle $\beta$, substantially exceeds 45°. In this embodiment, frustoconical support members 380, 382 are employed each having a corresponding major base surface 384, 386. The perimeters of the major base surfaces contact one another at the point 388, and respectively, engage the underlying support surface 204 at contact zones 390, 392. Each conical member 380, 382 also includes a corresponding minor base surface 394, 396 which minor base surfaces are facing one another in an inclined relationship. The major base surfaces are mutually inclined and are inclined relative to the support surface 204 by an angle $\alpha$. Moreover, the perimeter of the major bases 384, 386 have the rib-groove arrangement discussed in connection with FIG. 25a.

The conical support members 380, 382 are interconnected by an interconnection means 398 which may be provided with a pair of suitable conventional rollers to maintain the inclined posture of the frustoconical members relative to one another and to maintain the axial spacing therebetween.

Figure 29:
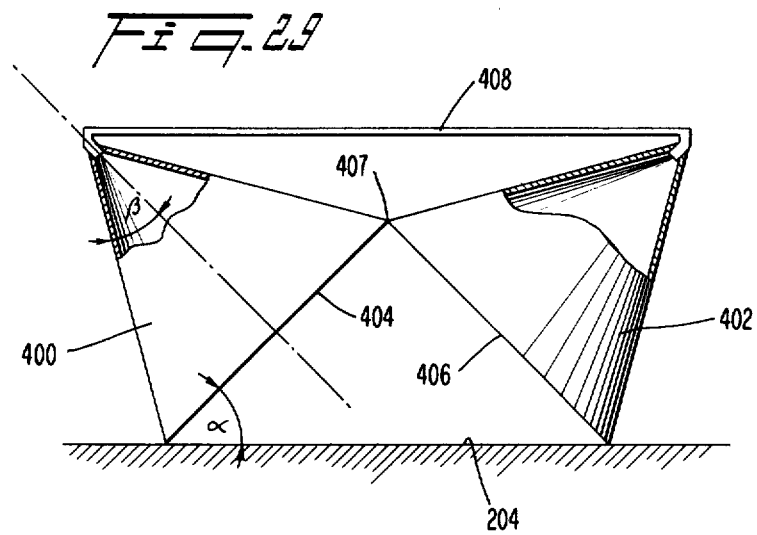
FIG. 29 is a front elevational view in partial cross section of a rolling assembly using a pair of conical members having an apex angle less than 90° and peripheral contact.

The conical support members may also have a cone angle $\beta$ less than 45° and still satisfy the conditions for stability in accordance with the present invention. In this connection (see FIG. 29), the conical support members 400, 402 are supported such that the apices are remote from the underlying support surface 204 and the bases 404, 406 of the conical members 400, 402 are inclined at an angle $\alpha$ relative to the support surface 204. The apexes of the cones are interconnected by an interconnection means 408 which spatially fixes the relationship between the cone apices in a manner that permits the rolling geometry to function in the manner described above. Moreover, a rib-groove arrangement is provided for the elevated point of contact 407.

Stability for this configuration is the same as discussed above provided a further condition is met for each conical member 400, 402 when no load is applied to the system: specially, $$\alpha + \arctan\left[\left(\frac{h}{3R}\right)\right] < 90°$$

where h is the cone height and R is the radius of the cone base. This latter condition assures self-righting stability to vertical and horizontal perturbations in the plane of the base surface 404.

Figure 30:
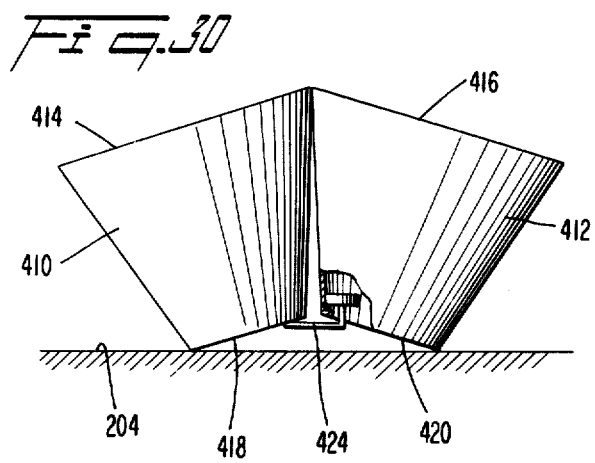
FIG. 30 is a front elevational view in partial cross section illustrating a pair of frusto-conical members having an apex angle less than 90° and peripheral contact.
Figure 31:
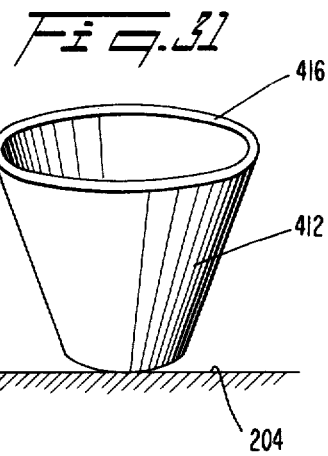
FIG. 31 is a side elevational view of the embodiment of FIG. 30.

Frustoconical support members having a cone angle β less than 45° can also be caused to operate with their minor bases in contact with the underlying support surface 204 (see FIG. 30). The frustoconical members 410, 412 each have a major base 414, 416 and a minor base 418, 420 respectively. Peripheral edges of the major bases 414, 416 have point contact at a point 422 vertically spaced above the underlying surface 204 and a rib-groove arrangement for vertical support vis-a-vis one another. An interconnection means 424 is utilized to hold the minor bases 418, 420 in the proper spatial relationship.

Again, in the absence of an external force load stability prevails for this system provided that the following condition is also statisfied:

$$\alpha + \arctan\left[\frac{h}{3} \frac{(R_1 + 2R_2)}{R_1(R_1 + R_2)}\right] < 90°.$$

Figure 32:
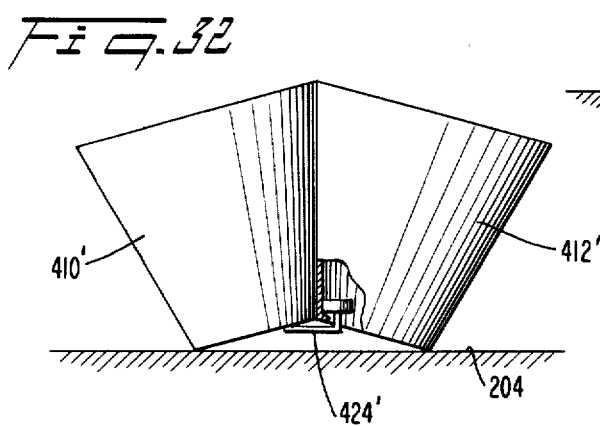
FIG. 32 is a front elevational view in partial cross section of a pair of frustoconical members capable of having perfect rolling along a line of contact and an apex angle less than 45°.

Another modification (see FIG. 32), has an interconnection means 424' designed so as to create line contact between the two frustoconical members 410', 412'. Again the stability condition set out above for FIG. 30 will provide the self-righting characteristics already discussed.

Figure 33:
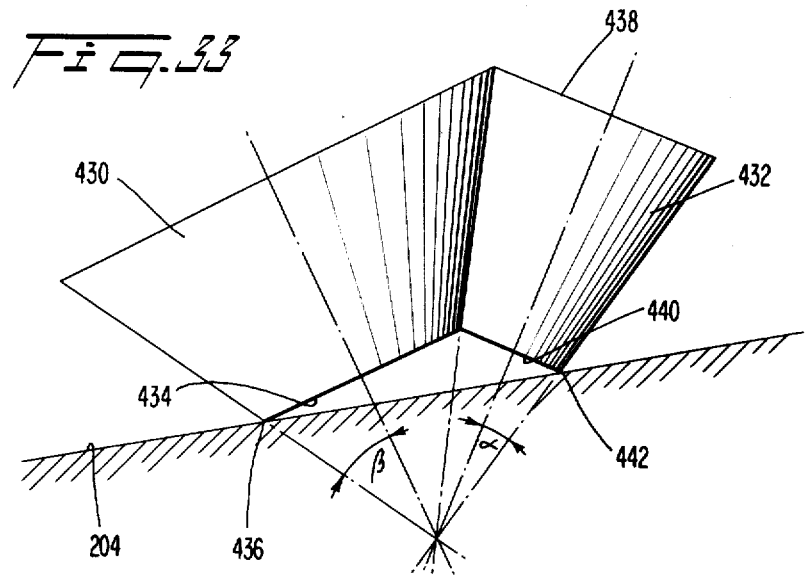
FIG. 33 is a front elevational view of a combined rolling support assembly having a conical member with a cone angle exceeding 45° and a frusto-conical member having an apex angle less than 45°.

Probably one of the most general configurations for conical members in rolling contact with one another is illustrated in FIG. 33. Here a frustoconical member 430 having a cone angle β is in line contact with a second frustoconical member 432 having a cone angle β substantially less than 45°, the angle β being larger than α. The minor base 434 of the first frustoconical member 430 is in contact with the underlying support surface 204 at a contact zone 436. The second frustoconical member 432 has both a major base 438 and a minor base 440. The perimeter of the minor base 440 is in contact with the underlying support surface 204 at a contact zone 442. Provided that the additional stability condition above in connection with FIG. 30 is met, then the system has all the stability characteristics discussed above. The embodiment of FIG. 33 is an equally valid rolling geometry. Generally speaking, for the geometry to function properly, the members must have a common apex when there is line contact. This condition does not, however, apply when there is only peripheral contact.

Figure 34:
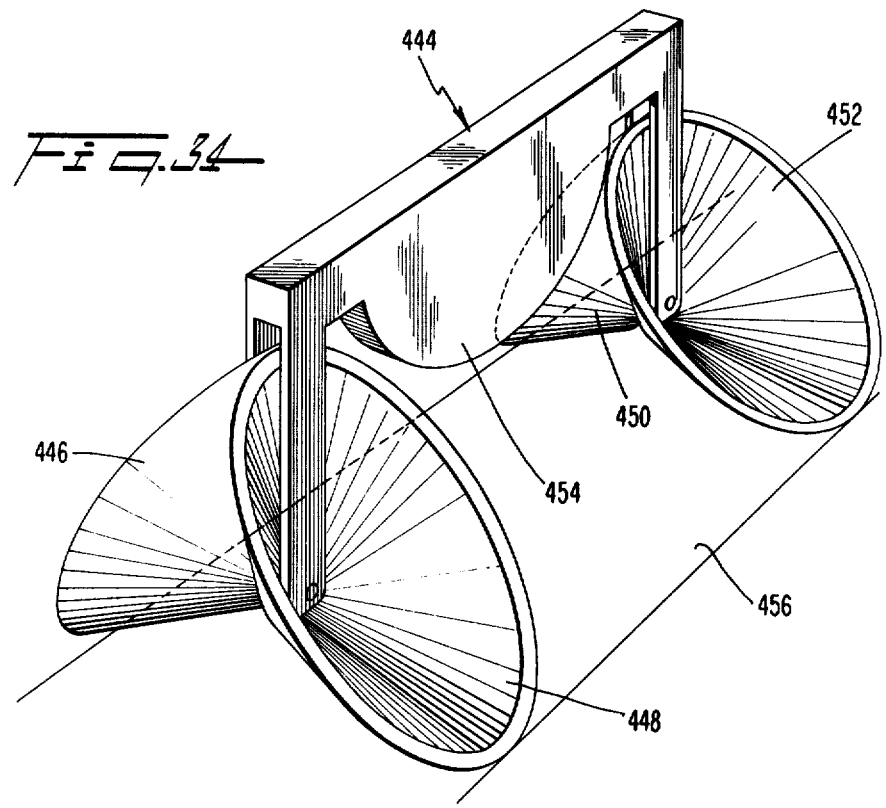
FIG. 34 is a perspective view of a rolling truck assembly using two pair of conical rolling support members.

Some specific applications of the conical rolling geometry will now be briefly described. A truck 444 (see FIG. 34) may include a tandem pair of rolling suspension systems having conical support members 446, 448 at one end and a second pair of conical support members 450, 452 at the other end. Such an assembly might, for example, be useful in transporting an article in a purely linear direction. Moreover, the truck assembly 444 may have a downwardly projecting central portion 454 spaced only a slight distance above the underlying support surface 456. With this construction, the inherent resiliency of the conical members may be employed in moving a weight less than a specified value. On the other hand, should the weight exceed the specified value, deflection of the conical members would permit the lower central portion 454 the truck assembly 444 to engage the underlying support surface and prevent movement of the assembly. In addition, damage to the conical members such as permanent deformations would also be avoided.

Novelty items may also be manufactured which incorporate the conical rolling geometry discussed above. For example (see FIG. 35), a tricycle may be devised which incorporates a pair of conical rolling supports 458, 460. The tricycle 462 may include a third wheel 464 to provide additional self-righting stability in the fore and aft direction of movement. A handlebar arrangement 466 may be provided so that one or the other cones 458, 460 may be frictionally engaged and retarded to slip one cone in its position with the other so as to permit the tricycle to change directions.

The task of moving garbage cans from one location to another might also be significantly eased using the frustoconical rolling geometry illustrated in FIG. 36. Frustoconical members 468, 470, such as garbage cans, might be interconnected by an assembly 472 pivotally connected to the bottom surface 474, 476 respectively of each can. The assembly 472 will preferably include a handle 478 so that the entire assembly can be conveniently pulled. With rolling contact between the garbage cans 468, 470 themselves, and with the peripheral edge of each bottom surface 474, 476 being engagement with the ground, the system will permit the can to rotate about their own respective axes of 478, 480 during movement from one position to another.

By virtue of the self-righting characteristics of the conical rolling geometry in the fore and aft direction, it is possible to make a bicycle arrangement in which the ground engaging surfaces are positioned laterally of the rider rather than tandemly in the fore and aft direction (see FIG. 37). In such an embodiment, the two conical members 482, 484 would be driven by a pedal arrangement 486 so as to rotate the cones and propel the device along the supporting surface 204. The geometry must be proportioned so that the effective radius is well above the combined rider and bike center of gravity.

In addition to the conical geometry and the annular hoop geometry discussed above, there is yet another basic geometry which utilizes the self-righting stability of the canted wheel concept. For example (see FIG. 38), a disc 500 may be inclined relative to the underlying support surface 204 by an angle α which provides an effective radius in a vertical plane which is substantially in excess of the radius of the disc 500. In order to maintain the disc 500 in its inclined attitude, a shaft 502 is rigidly connected to the disc and extends therefrom vertically upwardly along the axis 504 of the disc.

Preferably, the length of the shaft 502 is selected such that its vertically uppermost point 506 is positioned at the same elevation as the effective center of rotation for the disc 500. At this point 506, a suitable conventional thrust bearing 508 is provided in a housing 510. The housing 510 is positioned such that the bearing 508 is located at the intersection between the axis 504 of the disc and a vertical line 512 passing through contact zone 514 between the disc 500 and the underlying support surface 204.

As illustrated the shaft 502 may be convergently tapered in the direction tappered as it moves vertically upwardly away from the disc 500. This tapered configuration reflects the fact that the primary forces acting in the shaft 502 are compressive forces causing a bending moment which increases from zero at the end 506 if it is on the vertical through the ground contact point to a maximum at the junction of the shaft with the disc 500.

In order to prevent the disc 500 from being displaced laterally away from the housing 510, a second bearing assembly 516 connected to the housing 510 encircles the shaft 502 adjacent to disc 500. The second bearing assembly 516 provides a positioning effect and does not carry any substantial loads. The predominant portions of all force loads transmitted to the underlying surface 204 have a line of action passing through the upper bearing 508. Since the bearing 508 carries primarily a thrust loading and since all the bearing elements are sharing the load, it does not require a large radius, can be positioned at the small upper end of the shaft 502 and friction inherent in any bearing is minimized due to the small radius of action.

As seen in FIG. 39, the housing 510 may be provided with an aperture 518 into which the shaft 502 extends to engagement with the bearing 508. If desired, the entire wheel assembly could be enclosed by the housing 510.

As to stability, it will be seen from FIG. 39 that the system will have self-righting stability for perturbations causing rotation about an axis in the plane of the underlying surface 204 and in the plane of the figure. This stability follows from the general discussion above. In addition, perturbing forces causing a rotation of the system about the axis 504 of the shaft 502 will also elevate the center of gravity 511, thus, the system has self-righting stability for these forces.

An application of the canted wheel used in a rolling suspension system is given in FIGS. 40 and 41 where a rolling system 520 is adapted for motion along a rail or track 522. The rolling system 520 includes a pair of laterally spaced mutually inclined discs 524, 526 each of which includes a corresponding shaft 528, 530 that extends upwardly to a cap 532 of the connecting assembly 534. In addition, a secondary radial bearing 534, 536 is provided for each shaft 528, 530 respectively. Thus the interconnection assembly 534 is effective to laterally position the two discs 524, 526 relative to one another and to transmit forces directly to the corresponding shafts 528, 530. As illustrated in FIG. 41, the structure of the interconnecting means 534 need only be sufficient to position the secondary bearings 534, 536 relative to the primary bearings in the cap 532 and, accordingly, need not be a massive structure.

Stability of the rotations of the system about the track 522 first cause an elevation of the center of gravity accordingly, there is self-righting stability. For remaining degrees of freedom, the stability analysis of FIG. 38 is applicable. If the upper pivots 520, 532 are moved outwardly a small amount, a small overturning movement would tend to make the edge of the canted wheels grip the center rail if that were useful.

Figure 42:
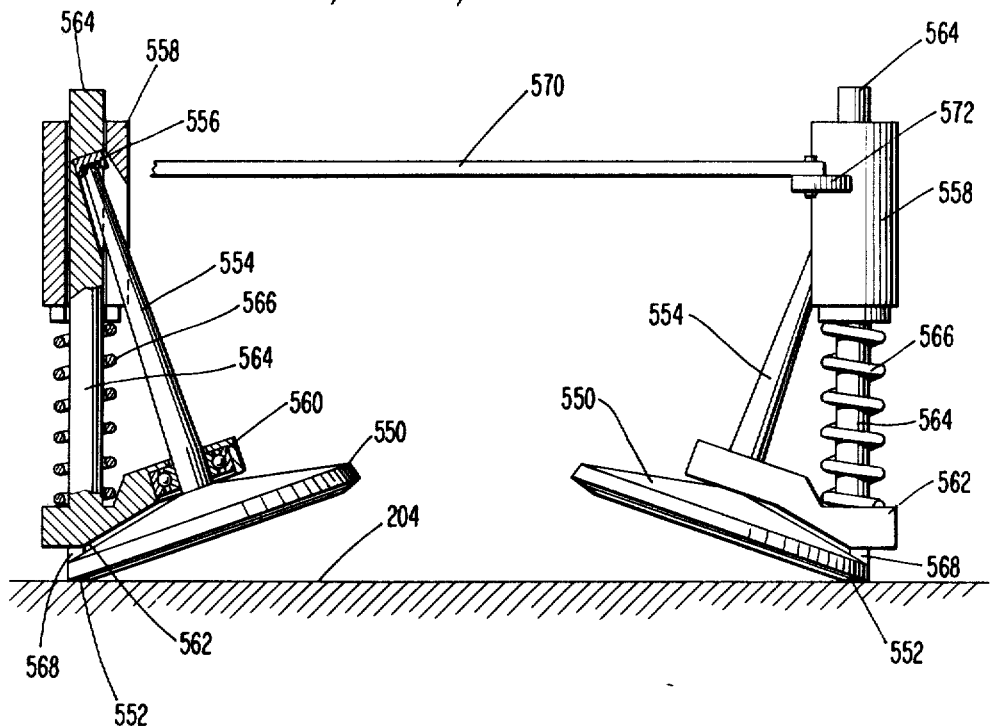
FIG. 42 is a view in partial cross section of a rolling support provided with shock absorbing and braking means.

In the event that it is desired to utilize the rolling support system of FIG. 38 in an automotive suspension system, it is necessary to provide a means for absorbing vertical shocks due to dynamic loadings on the vehicle wheels. Accordingly, in FIG. 42 a disc 550 is in rolling contact at a contact zone 552 with an underlying support surface 204. A tapered shaft 554 extends upwardly and away from the disc 550 to a thrust bearing 556 carried by a shaft 564. Thus, the spatial arrangement of the disc 550, the shaft 554, and the shaft 564 is fixed.

A secondary bearing 560 is carried by a housing structure 562 which also carries the shaft 564. As illustrated, the shaft 564 extends vertically upwardly and is in general longitudinal alignment with the contact zone 552. An upper housing 558 is slidably mounted on the shaft 564 so as to be vertically movable. Relative vertical movement of the upper housing 558 and the housing structure 562 is resisted by a spring 566. The spring 566 transmits force loadings from the vehicle to the housing structure 562 at a location near the disc thus providing a low center of applied forces on the system.

Such an assembly absorbs shocks as may be necessary in automotive suspension systems. Moreover, in order to retard the movement of the disc 550 with respect to the housing 562, a braking member 568 may be provided so as to be activated by a push rod or hydraulic plunger positioned inside shaft 564. The brake 568 is positioned in general vertical alignment with the contact zone 552 so braking forces react directly against the vehicle weight. With this orientation braking forces are applied directly through the disc 550 to the contact zone 552 so as not to induce twisting moments in the supporting geometry. The brake member 568 may, for example, be a solenoid operated, hydraulically operated, pneumatically operated, or actuated in any suitable conventional manner.

Figure 43:
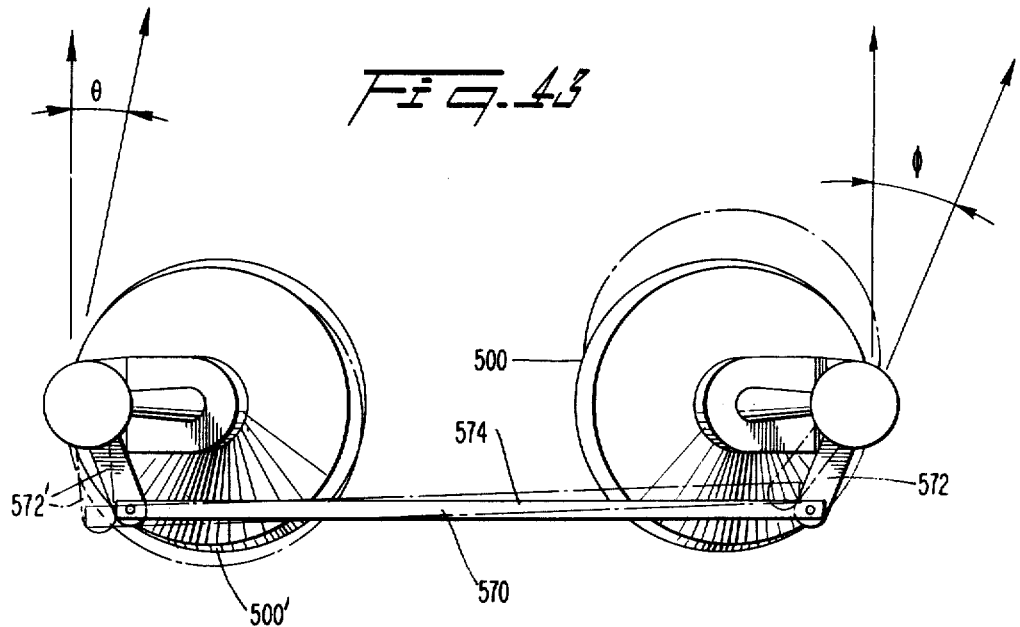
FIG. 43 is a plan view of a pair of canted rolling supports as illustrated in FIG. 42 adapted for three or four wheel element vehicle steering.

When such a shock absorbing support system in incorporated in a vehicle, it is also necessary to provide a mechanism for steering that vehicle. In this connection, FIG. 43 illustrates a pair shock absorbing braked wheel assemblies of the type discussed in reference to FIG. 42. The lower housing portions are connected by a link 570 (generally referred to as a tie bar). Each end of the link 570 is pivotably connected to corresponding pitman arms 572, 522' carried by the lower housing portion 562. By virtue of the geometrical arrangement, movement of the link 570 from the position illustrated in solid lines to the position 574 illustrated in phantom lines is accompanied by a dissimilar angular rotation of the two support assemblies relative to their own vertical axes. Thus, as illustrated in FIG. 43, the first disc 500 would experience an angular adjustment of 30°. Simultaneously, the second disc 500 would undergo an angular excursion in the same direction of a smaller angle. The geometrical portions of the system are selected such that the angle $\phi$, $\theta$ correspond to the inside and outside arcs traversed for a particular orientation of the interconnecting link 570 so as to induce skid free turning of both wheel elements about a virtual pivot on an extension of the rear wheel axis.

While the discussion above has described the suspension system of this invention in conjunction with a pair of support members, it will readily be perceived by those skilled in the art that such a configuration is not mandatory. More particularly, provided that any one of the support members discussed (i.e., discs, annuli, cones, or any similar surface of revolution) is maintained in the elevated position inclined relative to the underlying support surface by a suitable support means, then that support means will provide lateral stability. Here lateral is used in the sense of that direction which is coplanar with the contact zone and a vertical axis through the circular support member. In such an embodiment, fore and aft stability is provided by the large effective radius of curvature at the contact zone resulting from inclining the circular member at a small angle relative to the underlying support surface.

In such a modification, fore and aft stability may be enhanced or diminished depending on the characteristics of the support means. But in all applications of the geometry discussed herein, the lower the supported forces are when applied to the system, the greater the self-righting characteristics will be.

SUMMARY OF MAJOR ADVANTAGES

The following is a partial discussion of advantages to be obtained with this invention and is in no way considered to be exhaustive.

The rolling suspension system has self-righting stability in two mutually perpendicular planes. Accordingly, devices using the system can be provided with stability characteristics not heretofore available.

In another aspect, the rolling geometry of this suspension system reduces the frictional resistance to rolling motion experienced in conventional rolling systems by virtually eliminating sliding friction between bearing surfaces.

Moreover, system loads are efficiently transmitted to the underlying ground surface in a manner more closely related to thrust bearings than to radial bearings. Accordingly, smaller dimensions can be used with concurrent economies.

Also, by judiciously selecting the inclination angles for the rolling support members for applicable surface conditions of roughness and hardness, the effective radius of the support member can be several times the actual radius of the support member. Such a result is also accompanied by a reduction in the height required to accommodate the suspension system.

By virtue of the rolling relationship between bearing surfaces in the rolling geometry, lubrication requirements are substantially eased and, in many applications, will be completely eliminated.

And, in many useful applications, the size, weight and material requirements for the suspension system as well as the associated frame structure are substantially reduced. Accordingly, the overall system can experience significant weight reductions.

It should now be apparent that there has been provided in accordance with the present invention a novel rolling support system and a novel assemblies incorporating that suspension system in its various embodiments. Moreover, it will be apparent to those skilled in the art that numerous modifications, variations, substitutions and equivalents exist for features of the invention which do not materially depart from the spirit and scope thereof. Accordingly, it is expressly intended that all such modifications, variations, substitutions, and equivalents which fall within the spirit and scope of the invention as defined in the appended claims be embraced thereby.

What is claimed is:

1. A self-righting rolling support assembly comprising:
    a pair of circular support members, each being inclined at an acute angle relative to a support surface and having rolling contact with the support surface at a contact zone, the contact zones lying in a first plane perpendicular to the support surface and being spaced from one another to provide self-righting stability in the first plane;
    interconnection means for interconnecting the support members and maintaining the inclined relationship of the support members relative to the support surface; and
    a second plane perpendicular to both the support surface and the first plane, there being self-righting stability against tipping in both the first and second planes.

2. A self-righting rolling support assembly comprising:
    a pair of circular support members, each being inclined at an acute angle relative to a support surface and having rolling contact with the support surface at a contact zone, the contact zones lying in a first plane perpendicular to the support surface and being spaced from one another to provide self-righting stability in the first plane;
    interconnection means for interconnecting the support members and maintaining the inclined relationship of the support members relative to the support surface;
    a second plane perpendicular to both the support surface and the first plane, there being self-righting stability against tipping in both the first and second planes; and
    wherein the interconnection means includes a surface of revolution having pure rolling contact with each support member, the surface of revolution also being effective to elevate a portion of the respective support member in relation to the underlying surface.

3. The assembly of claim 2 wherein:
    the interconnection means includes a pair of frustoconical surfaces, and a cylindrical surface;
    each support member contacts a corresponding one of the frustoconical surfaces as well as the cylindrical surface of the interconnection means; and
    the interconnection means automatically compensates for unequal tangential velocities of the support members at the corresponding contact zone so as to be a self-acting differential.

4. The assembly of claim 2 wherein:
    the interconnection means includes two pair of frustoconical surfaces the frustoconical surfaces of each pair being juxtaposed to one another and having a common axis; and
    each support member has rolling contact with each of a corresponding pair of frustoconical surfaces of the interconnection means so that the frustoconical surfaces position the corresponding support member axially.

5. The assembly of claim 4 wherein the support members have a common radius and geometrically similar proportions so that tangential velocity of the support members is the same and the assembly will track a straight line.

6. The assembly of claim 4 wherein:
    the dimensions of one support member are proportional to the dimensions of the other support member; and
    the cone angles for the frustoconical surfaces supporting the first support member are related to the cone angles of the frustoconical surfaces supporting the other support member such that the tangential velocity of both support members is the same and the assembly tracks a straight line.

7. The assembly of claim 2 wherein:
    the interconnection means includes two pair of frustoconical surfaces, the frustoconical surfaces of one pair being between the frustoconical surfaces of the other pair; and each support member has rolling contact with a corresponding pair of frustoconical surfaces of the interconnecting means such that the support members can be nested.

8. The assembly of claim 2 wherein:

each support member is an annular hoop; and the interconnection means supports each hoop at an elevated remote position spaced from the contact zone, and is supported upon each hoop at a second position between the contact zone and the remote position with rolling contact.

9. The assembly of claim 8 wherein the remote positions for the hoops are adjacent one another and between the contact zones so that self-righting stability in the first plane predominates over self-righting stability in the second plane.

10. The assembly of claim 8 wherein the contact zones for the hoops are adjacent one another and between the remote positions for the hoops so that self-righting stability in the second plane predominates over self-righting stability in the first plane.

11. The assembly of claim 8 wherein the contact zone of one hoop is in general vertical alignment with the remote position for the other hoop so that lateral dimensions of the assembly are reduced.

12. The assembly of claim 11 further including means for adjusting the angular velocity of the hoops relative to one another so that the assembly can negotiate straight lines as well as curves.

13. A self-righting rolling support assembly comprising:

a pair of circular support members, each being inclined at an acute angle relative to a support surface and having rolling contact with the support surface at a contact zone, the contact zones lying in a first plane perpendicular to the support surface and being spaced from one another to provide self-righting stability in the first plane;

interconnection means for interconnecting the support members and maintaining the inclined relationship of the support members relative to the support surface;

a second plane perpendicular to both the support surface and the first plane, there being self-righting stability against tipping in both the first and second planes;

wherein each support member includes a conical section having a perimeter, the perimeter of one support member being in contact with the perimeter of the other support member; and wherein coupling means is provided to inhibit dislocation of the perimeters in the first plane.

14. A self-righting rolling support assembly comprising:

a pair of circular support members, each being inclined at an acute angle relative to a support surface and having rolling contact with the support surface at a contact zone, the contact zones lying in a first plane perpendicular to the support surface and being spaced from one another to provide self-righting stability in the first plane;

interconnection means for interconnecting the support members and maintaining the inclined relationship of the support members relative to the support surface;

a second plane perpendicular to both the support surface and the first plane, there being self-righting stability against tipping in both the first and second planes;

wherein each support member includes a conical section having a conical surface, the conical surface of one support member is in line contact with the conical surface of the other support member; and wherein the interconnection means holds the support members such that the apices of the respective conical sections coincide.

15. The assembly of claim 13 or 14 wherein:

each support member is frustoconical having a cone angle less the 45°, a major base and a minor base, and the perimeter of the minor base contacts the underlying surface.

16. The assembly of claim 13 or 14 wherein:

each support member is frustoconical having a cone angle greater than 45°, a major base and a minor base, the perimeter of the major base being in contact with the underlying surface at the contact zone.

17. The assembly of claim 13 or 14 wherein:

each support member is conical having a base, the perimeter of each base being in contact with the perimeter of the other support member and with the underlying surface.

18. The assembly of claim 17 wherein each support member has a cone angle greater than 45°.

19. The assembly of claim 13 or 14 wherein the cone angle of one support member is different from the cone angle of the other support member.

20. The assembly of claim 13 or 14 wherein the cone angle of one support member is the same as the cone angle of the other support member.

21. A self-righting rolling support assembly comprising:

a pair of circular support members, each being inclined at an acute angle relative to a support surface and having rolling contact with the support surface at a contact zone, the contact zones lying in a first plane perpendicular to the support surface and being spaced from one another to provide self-righting stability in the first plane;

interconnection means for interconnecting the support members and maintaining the inclined relationship of the support members relative to the support surface;

a second plane perpendicular to both the support surface and the first plane, there being self-righting stability against tipping in both the first and second planes;

wherein each support member includes an axle extending vertically in the first plane and having a length sufficient to intersect a vertical line in the first plane which passes through the respective contact zone; and wherein the interconnection means includes a first bearing at the end of each of the axles, another bearing adjacent each circular support member, and means for applying a vertical load between the first bearings and the contact zones.

22. A self-righting rolling support assembly comprising:

a pair of circular support members, each being inclined at an acute angle relative to a support surface and having rolling contact with the support surface at a contact zone, the contact zones lying in a first plane perpendicular to the support surface and being spaced from one another to provide self-righting stability in the first plane;

interconnection means for interconnecting the support members and maintaining the inclined relationship of the support members relative to the support surface;

a second plane perpendicular to both the support surface and the first plane, there being self-righting stability against tipping in both the first and second planes;

each support member includes an axle extending vertically in the first plane and having a length sufficient to intersect a vertical line in the first plane which passes through the respective contact zone;

the interconnection means includes a bearing at the end of each of the axles, another bearing adjacent each circular support member, and means for applying a vertical load between the first bearings and the contact zones;

the contact zones being closely adjacent one another; and a rail being positioned between the contact zones on which the assembly can travel.

23. A self-righting rolling support assembly comprising:
a pair of circular support members, each being inclined at an acute angle relative to a support surface and having rolling contact with the support surface at a contact zone, the contact zones lying in a first plane perpendicular to the support surface and being spaced from one another to provide self-righting stability in the first plane;
interconnection means for interconnecting the support members and maintaining the inclined relationship of the support members relative to the support surface;
a second plane perpendicular to both the support surface and the first plane, there being self-righting stability against tipping in both the first and second planes;
wherein each support member includes an axle extending vertically in the first plane and having a length sufficient to intersect a vertical line in the first plane which passes through the respective contact zone;
wherein the interconnection means includes a first bearing at the end of each of the axles, a second bearing adjacent each circular support member, and means for applying a vertical load between the first bearing and the contact zones; and
wherein the interconnection means is operable to rotate the position of the second bearing relative to the first plane so as to steer the support members.

24. A self-righting rolling support assembly comprising:
a pair of circular support members, each being inclined at an acute angle relative to a support surface and having rolling contact with the support surface at a contact zone, the contact zones lying in a first plane perpendicular to the support surface and being spaced from one another to provide self-righting stability in the first plane;
interconnection means for interconnecting the support members and maintaining the inclined relationship of the support members relative to the support surface;
a second plane perpendicular to both the support surface and the first plane, there being self-righting stability against tipping in both the first and second planes;
shock absorbing means for accommodating
wherein each support member includes an axle extending vertically in the first plane and having a length sufficient to intersect a vertical line in the first plane which passes through the respective contact zone;
wherein the interconnection means includes a first bearing at the end of each of the axles, a second bearing adjacent each circular support member, and means for applying a vertical load between the first bearing and the contact zones; and
shock absorbing means for accommodating impulsive vertical forces on the circular support member, connected between the first bearing and the second bearing.

25. A self-righting rolling support assembly comprising:
a pair of circular support members, each being inclined at an acute angle relative to a support surface and having rolling contact with the support surface at a contact zone, the contact zones lying in a first plane perpendicular to the support surface and being spaced from one another to provide self-righting stability in the first plane;
interconnection means for interconnecting the support members and maintaining the inclined relationship of the support members relative to the support surface;
a second plane perpendicular to both the support surface and the first plane, there being self-righting stability against tipping in both the first and second planes; and
brake means for retarding rotational movement of the circular support member, the brake means acting on the circular support member in vertical alignment with the contact zone.

26. A rolling support assembly comprising:
a circular support member, inclined at an acute angle relative to a support surface, having rolling contact with the support surface at a contact zone, the acute angle selected so that the effective radius of curvature for the member at the contact zone substantially exceeds the actual radius of the support member at the contact zone; and
support means engaging the support member with rolling contact and supporting the support member relative to the surface in the inclined position so as to provide self-righting lateral stability, the circular support member being effective to cause self-righting stability in a plane extending perpendicularly to the lateral direction.

27. The assembly of claim 26 wherein:
the support member is an annular disc having a central aperture, an outside radius, and a radial width, the radial width being large in comparison to the outside radius; and
the support means includes a shaft having a diameter smaller than the radius of the aperture.

28. The assembly of claim 27 wherein the ratio of the radial width of the outside radius exceeds 0.5.

29. The assembly of claim 27 wherein:
the shaft has a first frustoconical surface; and
the support member has a frustoconical surface configured to roll on the first frustoconical surface.

30. The assembly of claim 29 wherein:

the shaft includes a second frustoconical surface axially spaced from the first frustoconical surface; and the support member has a second frustoconical surface configured to roll on the second frustoconical surface of the shaft, the axially spacing of the first and second frustoconical surfaces of the shaft being effective to position the support member with respect to the shaft.

31. The assembly of claim 26 wherein:

the support member includes a circular disc with an axis of symmetry, a shaft extending along the axis of symmetry away from the support surface with a length sufficient to intersect a vertical line extending vertically through the contact zone; and the support means includes a structure fixing the shaft end vertically above the contact zone.

32. The assembly of claim 26 wherein:

the support member is an annular ring having an outside radius and a radial width, the radial width being small in comparison to the outside radius.

33. The assembly of claim 32 wherein:

the ratio of the radial width to the outside radius is less than 0.5.

34. The assembly of claim 26 wherein:

support member includes a surface of revolution with a circular base, the circular base being inclined at the acute angle relative to the support surface and being in rolling contact with the support surface at the contact zone; and the support means has rolling contact with the perimeter of the circular base.

35. The assembly of claim 34 wherein the support member is conical.

36. The assembly of claim 34 wherein the support member is frustoconical.

37. A rolling geometry arrangement comprising:

a rotatable circular member having an axis of symmetry; and support means including a surface portion with an axis, engaging the circular member with rolling contact on the surface portion and supporting the circular member such that the axis of symmetry is inclined at an acute angle relative to the axis and such that the angular velocity of the circular member about its axis of symmetry is different from the angular velocity of the surface portion about its axis.

38. A rolling geometry arrangement comprising:

a rotatable circular member having an axis of symmetry;

support means including a surface portion with an axis, the surface portion engaging the circular member with rolling contact and supporting the circular member such that the axis of symmetry is inclined at an acute angle relative to the axis and such that the angular velocity of the circular member about its axis of symmetry is different from the angular velocity of the surface portion about its axis; and a second rotatable circular member having a corresponding axis of symmetry, mounted on the support means such that the corresponding axis of symmetry is inclined at a second acute angle relative to the axis so that both circular members rotate relative to the support means.

39. The rolling geometry arrangement of claim 38 wherein each circular member has a radial width and an outside radius, the radial width being less than half of the outside radius.

40. The rolling geometry arrangement of claim 39 wherein the circular members are nested and inclined relative to one another.

41. The rolling geometry arrangement of claim 40 wherein each circular member is in rolling contact with a corresponding pair of circular plates mounted for rotation about a second axis perpendicular to the first axis so as to provide a self-reacting assembly.

* * * * *